(12) United States Patent
Ke et al.

(10) Patent No.: US 11,388,770 B2
(45) Date of Patent: Jul. 12, 2022

(54) METHOD AND APPARATUS FOR SUPPORTING CONNECTION MAINTENANCE AND RELEASE FOR USER EQUIPMENT

(71) Applicant: Samsung Electronics Co., Ltd., Suwon-si (KR)

(72) Inventors: Xiaowan Ke, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 565 days.

(21) Appl. No.: 16/325,064

(22) PCT Filed: Aug. 10, 2017

(86) PCT No.: PCT/KR2017/008710
§ 371 (c)(1),
(2) Date: Feb. 12, 2019

(87) PCT Pub. No.: WO2018/030826
PCT Pub. Date: Feb. 15, 2018

(65) Prior Publication Data
US 2021/0289579 A1    Sep. 16, 2021

(30) Foreign Application Priority Data

Aug. 12, 2016  (CN) .......................... 201610666103.0
Aug. 12, 2016  (CN) .......................... 201610666351.5
(Continued)

(51) Int. Cl.
*H04W 76/27* (2018.01)
*H04W 36/00* (2009.01)
(Continued)

(52) U.S. Cl.
CPC ....... *H04W 76/27* (2018.02); *H04W 36/0033* (2013.01); *H04W 36/08* (2013.01); *H04W 68/005* (2013.01); *H04W 68/02* (2013.01)

(58) Field of Classification Search
CPC . H04W 76/27; H04W 28/0215; H04W 68/00; H04W 68/02; H04W 76/30
See application file for complete search history.

(56) References Cited

U.S. PATENT DOCUMENTS

| | | |
|---|---|---|
| 2016/0029426 A1 | 1/2016 | Bangolae et al. |
| 2016/0143059 A1 | 5/2016 | Jha et al. |

(Continued)

FOREIGN PATENT DOCUMENTS

| | | |
|---|---|---|
| CN | 101242645 A | 8/2008 |
| WO | 2016/014179 A1 | 1/2016 |
| WO | 2016-064458 A1 | 4/2016 |

OTHER PUBLICATIONS

Huawei et al.; Evaluation on RAN initiated paging and MME initiated paging; 3GPP TSG-RAN WG2 Meeting #94 R2-163930; May 23-27, 2016; Nanjing, China.

(Continued)

*Primary Examiner* — Nam T Huynh
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety (Continued)

services. The present disclosure provides a method for controlling services of a user equipment (UE) in a light connection, including: a first radio access network (RAN) node determines whether a predetermined condition is met, when determining that the predetermined condition is met, the first RAN node controls to transmit information about light connection state of the UE, and/or, indication information about light connection of the UE, based on the connection control. The present disclosure also provides a method for controlling data continuity of a UE, including: a core network (CN) node receives information about light connection state of the UE, and/or, indication information about light connection of the UE; the CN node control services of the UE, based on foregoing received information. The present disclosure also provides another method for controlling services of a UE in a light connection, and a corresponding device. By adopting the technical solution of the present disclosure, from one aspect, signaling overheads are saved by using the light connection, from another aspect, implementations of existing functions and services will not be affected by introducing the light connection. The present invention provides a data continuity controlling method for a UE, which recites: determining, by a first radio access network node, whether a preset condition is satisfied; and when determining that the preset condition is satisfied and the UE performs Cellular Internet of Things (CIOT) service, transmitting, by the first radio access network node, data transmission information associated with the UE and/or data forwarding requirement information associated with the UE. The present invention further provides another data continuity controlling method for a UE, which recites: obtaining, by a first core network node, data transmission information associated with the UE, and/or receiving a data packet of the UE; performing, by the first core network node, Cellular Internet of Things (CIOT) data transmission control according to the obtained data transmission information associated with the UE and/or the received data packet of the UE. The present invention further provides other data continuity controlling methods for a UE and corresponding devices. According to technical solutions disclosed by the present disclosure, data continuity can be implemented at the same time when saving UE energy.

15 Claims, 32 Drawing Sheets

(30) Foreign Application Priority Data

Sep. 30, 2016 (CN) .......................... 201610875897.1
May 2, 2017 (CN) .......................... 201710301927.2

(51) Int. Cl.
  *H04W 36/08* (2009.01)
  *H04W 68/00* (2009.01)
  *H04W 68/02* (2009.01)

(56) References Cited

U.S. PATENT DOCUMENTS

2016/0234877 A1    8/2016  Bangolae et al.
2017/0251516 A1    8/2017  Bangolae et al.
2019/0132900 A1*   5/2019  Hong ................ H04W 28/0215

OTHER PUBLICATIONS

European Search Report dated Jan. 24, 2020; European Appln. No. 17839843.4-1231 / 3485695 PCT/KR2017008710.
LG Electronics Inc.; Discussion on paging for a lightly connected Ue; 3GPP TSG-RAN WG3 Meeting # 92 R3-161264; May 23-27, 2016; Nanjing, China.
Nokia et al.; Paging for light connection; 3GPP TSG-RAN WG3 Meeting #92; R3-161352; May 23-27, 2016; Nanjing, China.
Huawei et al.; New WI proposal: Signalling reduction to enable light connection for LTE; 3GPP TSG RAN Meeting #71; RP-160540; Mar. 7-10, 2016; Gothenburg, Sweden.
Huawei et al.; Revision of WI: Signalling reduction to enable light connection for LTE; 3GPP TSG RAN Meeting #72 RP-160937; Jun. 13-17, 2016; Busan, South Korea.
Korean Office Action with English translation dated Feb. 26, 2021; Korean Appln. No. 10-2018-7036477.
Chinese Office Action dated Nov. 30, 2021, cited in a counterpart Chinese Application No. 201710301927.2.

* cited by examiner

METHOD AND APPARATUS FOR SUPPORTING CONNECTION MAINTENANCE AND RELEASE FOR USER EQUIPMENT

TECHNICAL FIELD

The present disclosure relates to wireless communication technologies, and more particularly, to a method for controlling services of a user equipment (UE) in light connection, to data continuity controlling methods and apparatuses for a UE.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Modern mobile communications increasingly tend to provide a multimedia service with high-speed transmission for users.

FIG. 1 is a schematic diagram illustrating a system architecture of System Architecture Evolution (SAE). A user equipment (UE) 101 is a terminal device supporting a network protocol. An Evolved Universal Terrestrial Radio Access Network (E-UTRAN) 102 is a radio access network (RAN), which includes an evolved Node B (eNodeB/NodeB) providing a wireless network interface for the UE. A mobility management entity (MME) 103 is in charge of managing mobile context, session context, and security information of the UE. A serving gateway (SGW) 104 mainly provides functions of a user plane. The MME 103 and the SGW 104 may be located within the same physical entity. A Packet Data Network Gateway (PGW) 105 is responsible for functions, such as charging, legal monitoring. The PGW 105 and SGW 104 may also be located within the same physical entity. A Policy and Charging Rules Function (PCRF) 106 provides a Quality of Service (QoS) strategy and a charging criterion. A Serving GPRS Support Node (SGSN) 108 is a network node device in a Universal Mobile Telecommunications System (UMTS), which provides offloading for data transmission. A Home Subscriber Server (HSS) is a home ownership subsystem, which takes charge of protecting user information, such as current position of a UE, an address of a serving node, user security information, packet data context of a UE.

FIG. 2 is a schematic diagram illustrating an initial system architecture of a next generation network (5G), which includes: a NextGen UE, a NextGen access network (AN), a NextGen radio access network (R)AN, a NextGen Core and a data network. A control plane interface between the Next Gen (R)AN and the NextGen Core is NG2 (which may be referred to as NG-C), a user plane interface therebetween is NG3 (which may be referred to as NG-U). Names of these interfaces are temporary names. Main contents of the present disclosure will not be affected, when 3GPP finally determines to adopt other names. The NextGen Core further includes a user-plane functional entity and a control-plane functional entity. NextGen Core further includes a user-plane functional entity and a control-plane functional entity.

In a foreseeable future, there will be more and more intelligent electrical equipment. Life peripheral supplies are interconnected, which possess functions of accessing a network. From one aspect, some UEs in the future generally have the following characteristics: static, or low mobility, low cost, a small amount of discontinuous data is received and transmitted. For these UEs, signaling overheads resulted from connection setup and connection releasing are much greater than the amount of data received and transmitted. From another aspect, to support more and more real-time applications, such as virtual reality, access delay of future mobile communication network is greatly reduced. In order to save signaling overheads, improve efficiency of data transmission, and reduce delay for a UE to access a network, there are still a lot of problems to be solved in the existing network.

Current mobile communication increasingly tends to provide multimedia services with high rate transmission for users. FIG. 17 is a schematic diagram illustrating system architecture of a System Architecture Evolution (SAE).

A UE 1701 is a terminal device supporting network specifications. Evolved Universal Terrestrial Radio Access Network (E-UTRAN) 1702 is a wireless transmission network, which includes an evolved Node B (eNodeB/NodeB) providing an interface for accessing a radio network. A Mobility Management Entity (MME) 1703 is responsible for managing a mobility context, a session context, security information of the UE. A Serving Gateway (SGW) 1704 mainly provides user plane functions. The MME 1703 and the SGW 1704 may be located in a same physical entity. A PDN gateway (PGW) 1705 is mainly responsible for functions, e.g., billing and lawful interception, may also be located in a same physical entity with the SGW 1704. A Policy and Charging Rules Function (PCRF) 1706 provides QoS strategies and billing rules. A Serving GPRS Support Node (SGSN) 1708 is a network node equipment providing routing for data transmission in Universal Mobile Telecommunications System (UNTS). A Home Subscriber Server (HSS) 1709 is a home belonging sub-system of the UE, and is responsible for protecting user information including such as a current location of the user equipment, an address of a server node, user security information, and packet data context of the user equipment.

FIG. 18 is a schematic diagram illustrating initial system architecture for a next generation of network (5G), The initial system architecture includes a next generation (Next-Gen) UE, a next generation access network or a next generation radio access network (Next Gen (R)AN), a next generation core network (NextGen Core) and a data network. A control plane interface between the Next Gen (R)AN and the NextGen Core is NG2, and a user plane interface is NG3. These interfaces are named temporarily, and the use of other names eventually decided by the 3GPP will not influence the main contents of the present invention. The NextGen Core further comprises a user plane functional entity and a control plane functional entity.

In a predictable future, more and more electrical devices are intelligent, more and more supplies surrounding the life are interconnected with each other, all of which have a network access function. In one side, partial UEs in the future usually have the following characteristics: static or low mobility, low cost, an amount of transmitted and received data is usually small, and discontinuous. For these UEs, signaling overhead caused by connection establishment and connection release is much larger than the amount of the transmitted and received data. In the other side, in order to support more and more real-time applications, e.g., virtual reality, access time delay of the future mobile communication network will be greatly reduced, and in order to save signaling overhead, improve data transmission efficiency, reduce time delay that the UE access the network, some problems still exist in the existing network.

DISCLOSURE OF INVENTION

Technical Problem

The present disclosure provides a method and a device for controlling services of a UE in a light connection, so as to synchronize the light connection state of the UE in a network, and support service operations in the light connection.

Solution to Problem

Technical solutions of the present disclosure are as follows.

A method for controlling a service of a UE in a light connection, including:

determining, by a first radio access network (RAN) node, whether a predetermined condition is met; and, when determining that the predetermined condition is met, transmitting, by the first RAN node, information about a light connection state of the UE, and/or, indication information about the light connection of the UE.

Preferably, the predetermined condition is a change of the light connection state of the UE, which includes:

entering the light connection from another state, leaving the light connection and entering another state, determining by the first RAN node whether the UE can perform the light connection; and/or, wherein the predetermined condition is that the UE is in the light connection state, which includes at least one of:

disconnecting, by the UE, the light connection between the UE and a first RAN;

accessing a second RAN node by the UE; or, receiving, by the first RAN node, control plane signaling related to the UE; and/or wherein the predetermined condition is receiving a UE connection state retrieve request.

Preferably, the information about the light connection state of the UE includes at least one of:

an indication of the light connection state of the UE, a message in a one-to-one correspondence with a different light connection state of the UE, the UE identity of the UE in the light connection, and/or, wherein the indication information about the light connection of the UE comprises: an indication about whether the UE can perform the light connection.

Preferably, transmitting by the first RAN node the information about the light connection state of the UE, and/or, indication information about the light connection of the UE includes: transmitting, by the first RAN, the information about the light connection state of the UE, and/or, the indication information about the light connection of the UE, to a CN node, the UE, or the second RAN node.

Preferably, transmitting by the first RAN node the information about the light connection state of the UE, and/or, the indication information about the light connection of the UE includes at least one of:

not responding to control plane signaling related to the UE in the light connection;

rejecting the control plane signaling related to the UE in the light connection;

transmitting the information about the light connection state of the UE;

requesting to re-transmit the control plane signaling related to the UE to a second RAN node;

requesting not to reject the received control plane signaling;

indicating that the UE is switching to another RAN node;

transmitting an identity of a second RAN; or, an identity of an RAN node to which the UE is going to switch.

The present disclosure provides an RAN device, including a transmitting module and a controlling module, wherein the controlling module is configured to determine whether a predetermined condition is met, when determining that the predetermined condition is met, the controlling module is further configured to control the transmitting module to transmit information about a light connection state of a user equipment (UE), and/or, indication information about a light connection of the UE, and the transmitting module is configured to transmit the foregoing information under the control of the controlling module.

The present disclosure provides a method for controlling a service of a UE in a light connection, including:

receiving, by a CN node, or a UE, or a second RAN node, information about a light connection state of the UE, and/or, indication information about the light connection of the UE; and, controlling, by the CN node, or the UE, or a second RAN node, the service of the UE, based on the received information about the light connection state of the UE, and/or, the indication information about the light connection of the UE.

Preferably, the information about the light connection state of the UE includes at least one of:

a light connection indication, an indication for leaving the light connection, a connected state indication, an idle state indication, the UE identity of the UE in the light connection.

Preferably, controlling by the CN node, or the UE, or the second RAN node, the service of the UE, based on the received information about the light connection state of the UE, and/or, the indication information about the light connection of the UE, includes at least one of:

learning, by the CN node, or the UE, or the second RAN node, whether the UE is in the light connection, based on the received information about the light connection state of the UE; when learning that the UE is in the light connection, or learning that the UE needs to perform the light connection, controlling, by the CN node, or the UE, or the second RAN node, the service of the UE in the light connection;

learning, by the CN node, or the UE, or the second RAN node, whether the UE can perform the light connection, based on the received indication information about the light connection of the UE; when learning that the UE is in the light connection, or learning that the UE needs to perform the light connection, controlling, by the CN node, or the UE, or the second RAN node, the service of the UE in the light connection.

Preferably, controlling by the CN node the service of the UE in the light connection includes at least one of:

buffering control plane data of the UE;

extending retransmission time of the control plane data of the UE;

transmitting user plane data of the UE to an RAN node;

triggering a UE paging;

when the CN node is overloaded, not offloading the UE in the light connection;

when the UE is called as a callee, not immediately responding to a paging request coming from a circuit domain;

maintaining, by the CN node, a UE connection between a user plane of a CN and an RAN;

only transmitting a paging to an RAN node, which stores a UE context of the UE;

not rejecting, by a control plane node in the CN, received control plane signaling related to the UE;

re-transmitting, by the control plane node in the CN, the control plane signaling to a second RAN node accessed by the UE;

when generating the control plane signaling by the CN, transmitting the control plane signaling until the UE enters a connected state.

The present disclosure provides a network device, including a receiving module, a transmitting module and a controlling module, wherein the receiving module is configured to receive indication information about a light connection state of a UE, and/or, indication information about a light connection of the UE, and the controlling module is configured to control the transmitting module to perform an associated operation, based on the foregoing information.

The present disclosure provides a method for controlling a service of a UE in a light connection, including:

learning, by a first RAN node, information for offloading the UE, and/or, paging response demand information;

controlling, by the first RAN node, to offload the UE, and/or, to page the UE, based on the learned information for offloading the UE, and/or, the paging response demand information.

Preferably, the paging response demand information includes at least one of: whether a paging response from the UE is needed, or a paging reason, and/or, the information for offloading the UE includes at least one of: releasing the UE connection, requesting the UE to initiate a location update, requesting the UE not to provide an identity of a first CN node and a connected state indication.

Preferably, controlling, by the first RAN node, to offload the UE, and/or, to page the UE includes: controlling, by the first RAN node, to offload the UE, and/or, to page the UE, wherein the UE is in the light connection, or the UE can perform the light connection.

Preferably, controlling by the first RAN node to offload the UE, and/or, to page the UE, wherein the UE is in the light connection, or the UE can perform the light connection, includes at least one of:

releasing a UE connection between a first RAN and a CN;

releasing the UE connection between the first RAN and the CN, while maintaining a UE context;

initiating a paging for the UE;

requesting a third RAN to initiate a paging for the UE;

transmitting the information for offloading the UE to a third RAN node;

transmitting the paging response demand information to the third RAN node;

transmitting the information for offloading the UE to the UE; or, transmitting the paging response demand information to the UE.

Preferably, learning, by the first RAN node, the information for offloading the UE, and/or, the paging response demand information includes:

receiving, by the first RAN node, the information for offloading the UE, and/or, the paging response demand information from a second RAN node, the first CN node, or the UE.

The present disclosure provides a network device, including a receiving module, a transmitting module, and a controlling module, wherein the receiving module is configured to receive indication information for offloading a UE, and/or, paging response demand information;

the controlling module is configured to control to offload the UE, based on the received for offloading the UE, and the controlling module is further configured to control the transmitting module to perform an associated operation.

The present disclosure provides a method for controlling a service of a UE in a light connection, including:

receiving, by the UE, paging response demand information, and/or, information for offloading the UE;

performing, by the UE, a paging response control, based on the paging response demand information, and/or, the information for offloading the UE.

Preferably, the paging response demand information includes at least one of: whether a paging response from the UE is needed, or a paging reason;

preferably, the information for offloading the UE includes at least one of: releasing a UE connection; requesting the UE to initiate a location update; requesting the UE not to provide a connected state indication for an identity of a first CN node.

Preferably, performing by the UE the paging response control, based on the paging response demand information, and/or, the information for offloading the UE includes at least one of:

determining, by the UE, whether to return a paging response, on the basis of whether the paging response from the UE is needed, wherein the UE determines whether to return the paging response based on the information for offloading the UE;

determining, by the UE, whether to return the paging response, based on the paging reason.

Preferably, determining by the UE whether to return the paging response, on the basis of whether the paging response from the UE is needed, includes:

when the paging response from the UE is needed, returning, by the UE, the paging response;

when the paging response from the UE is not needed, not returning, by the UE, the paging response;

and/or, determining by the UE whether to return the paging response based on the information for offloading the UE includes:

not returning, by the UE, the paging response, based on the information for offloading the UE.

The present disclosure provides a UE, including a receiving module, a transmitting module and a controlling module, wherein the receiving module is configured to receive paging response demand information, and/or, information for offloading the UE, from a network device;

the controlling module is configured to perform a paging response control, based on the received paging response demand information, and/or, the information for offloading the UE; and the controlling module is further configured to control the transmitting module to perform an associated operation.

Based on foregoing technical solutions, it can be seen that a CN node synchronizes the light connection state of the UE by using an RAN node, and reasonably controls each function and service of the UE in the light connection state. From one aspect, signaling overheads are saved by using the light connection. From another aspect, implementations of existing functions and services are not affected, by introducing the light connection. In addition, by adopting such technical solution, functions of compatibly supporting offloading UEs in the light connection state may be implemented, which may effectively alleviate loads of the CN.

The present invention provides data continuity controlling methods and apparatuses for a UE, so as to reduce data packet loss, improve user experience.

Technical solutions of the present disclosure are as follows. A data continuity controlling method for a UE includes:

determining, by a first radio access network node, whether a preset condition is satisfied; and when determining that the preset condition is satisfied and the UE performs a Cellular Internet of Things (CIOT), transmitting, by the first radio access network node, data transmission information associated with the UE and/or data forwarding requirement information associated with the UE.

A network device includes a receiving module, a controlling module and a transmitting module:

the controlling module is configured to determine whether a preset condition is satisfied; and when determining that the preset condition is satisfied, control the transmitting module to transmit data transmission information associated with the UE and/or data forwarding requirement information associated with the UE; and the transmitting module is configured to transmit the information under control of the controlling module.

A data continuity controlling method for a UE includes:

obtaining, by a first core network node, data transmission information associated with the UE, and/or receiving a data packet of the UE;

performing, by the first core network node, Cellular Internet of Things (CIOT) data transmission control according to the obtained data transmission information associated with the UE and/or the received data packet of the UE.

A network device includes a receiving module, a transmitting module and a controlling module:

the receiving module is configured to receive information associated with the UE indicating data transmission from a network device;

the controlling module is configured to control the transmitting module to perform an association operation according to the information.

A data continuity controlling method for a UE includes:

determining, by a first core network node, whether a preset condition is satisfied; and when determining that the preset condition is satisfied and the UE is within a Cellular Internet of Things (CIOT), allocating, by the first core network node, data forwarding address information.

A network device includes a receiving module, a transmitting module, and a controlling module:

the controlling module is configured to determine whether a preset condition is satisfied; and when determining that the preset condition is satisfied, control the transmitting module to transmit allocated data forwarding address information; and the transmitting module is configured to transmit the information under control of the controlling module.

Advantageous Effects of Invention

It can be seen from the technical solutions above, the present disclosure supports implementation of backhaul and forwarding of non-transmission data through two ways, i.e., a handover way or a non-handover way, which can improve service continuity of the UE when performing control plane CIOT mobility. The non-handover way does not require the UE to perform neighbor cell measurement and a measurement report, which can implement save energy, and cannot lose data when the UE becomes unreachable. The non-handover way is suitable for data which does not have a high requirement for time delay. For data having the high requirement for the time delay, the service continuity can be implemented through the handover way. Since the existing handover does not support UE handover for a user plane bearer, through the method, the UE for which only control plane interaction is performed for handover and there is no user plane bearer. According to the method in the present disclosure, service experience of the UE in the NB IOT can be improved, and condition for a great amount of IOT devices to access the network can be created, and technical support can be provided for the next generation of mobile communication application in the further.

MODE FOR THE INVENTION

To make objectives, technical solutions and advantages of the present disclosure more clear, detailed descriptions of the present disclosure will be provided in the following, accompanying with attached figures and embodiments.

Figure 1:
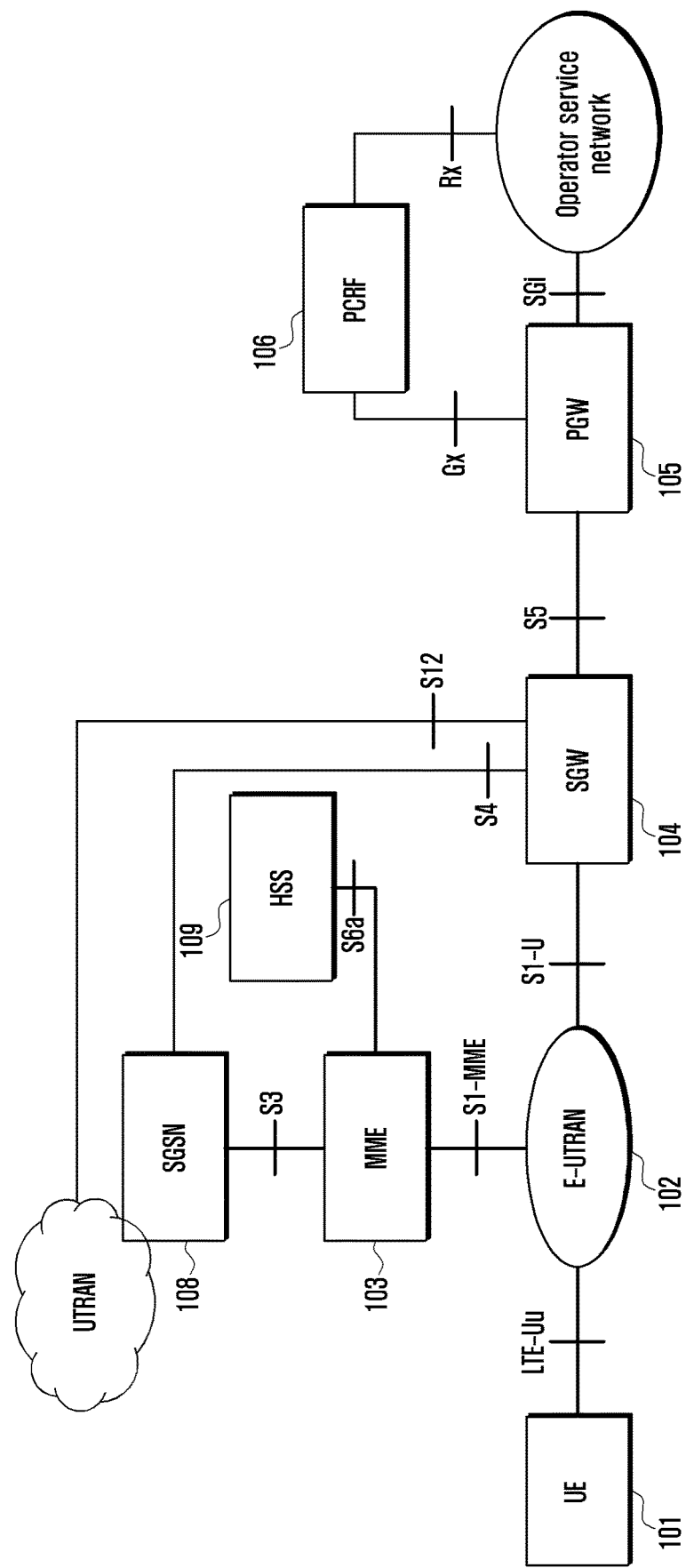
FIG. 1 is a schematic diagram illustrating a system architecture of a SAE, in accordance with an embodiment of the present disclosure.
Figure 2:
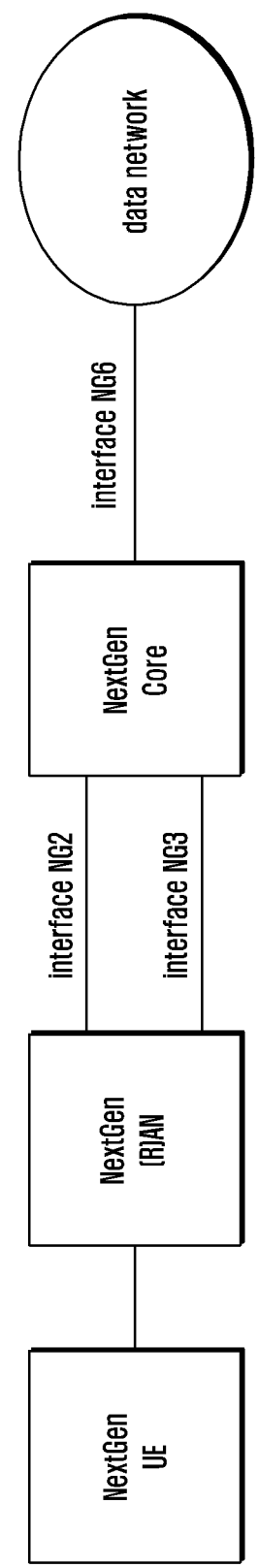
FIG. 2 is a schematic diagram illustrating an initial system architecture of a next generation network (5G), in accordance with an embodiment of the present disclosure.

To reduce paging scope and service setup signaling, a UE connection mode of light connection is put forward at present. The light connection refers to the following scene. When an RAN releases a UE connection or a UE is inactive, the RAN does not request a CN to release the UE connection, such as, the UE connection between an eNB and a MME (S1-interface control plane), the UE connection between an eNB and a SGW (S1-interface user plane), the UE connection between an eNB and an Access and Mobility Management Function (AMF) (NG-C interface control plane), the UE connection between an eNB and a User Plane Function (UPF) (NG-U interface user plane). When the UE is in an idle state or the UE is inactive, the RAN still maintains the UE context, and the CN (such as MME, SGW, AMF, SMF, UPF) may still consider that the UE is in the connected state. When there is downlink data, the CN (such as SGW, UPF) transmits the data of the UE to the eNB. At this time, if the UE is already in the idle state or the UE is inactive (e.g., the connection between the UE and the eNB is disconnected, suspended, or inactive), the eNB may initiate a paging to the UE. The light connection may be applied to two architectures, SAE and 5G, as shown in FIG. 1 and FIG. 2.

After putting forwarding the UE connection mode of foregoing light connection, if connection between a UE and a network is disconnected or inactive, when the UE enters the light connection state, the UE connection between the RAN and CN is maintained. Subsequently, the UE considers that the UE is in the idle state (such as, EPS Connection Management (ECM) idle), in the light connection, or in the inactive state. The CN considers that the UE is in the connected state (such as, ECM Connected). A series of problems may be resulted from recognition inconsistency of UE state between UE and CN, which will be analyzed one by one in the following.

A first problem: when the CN generates control signaling for the UE, such signaling will be directly transmitted to an RAN node. After the UE is paged by the RAN node, the UE may resume the connection to the network via another RAN node. In the existing network, data forwarding on the control plane is not supported.

A second problem: when the connection between the UE and the RAN is disconnected, the UE is in the ECM idle state, or inactive, or in the light connection. However, the UE connection between the RAN and CN is maintained in the light connection state. At this time, when requiring that recognitions for the UE state between the UE and CN are consistent, the UE needs to maintain the ECM connected state. Some functions relevant with ECM idle will not be executed, such as energy saving mode. A UE under the energy saving mode is very sensitive to electric quantity. Electricity consumption will be accelerated, when a UE under the energy saving mode maintains the ECM connected state.

A third problem: for a callee in a Circuit Switch Fallback (CSFB), when a CN node, e.g., a MME, receives a called paging request from a mobile switching center (MSC), the UE is paged by the MME. For a UE in the idle state or in the light connection, the MME needs to receive a paging response (extended service request), and then returns the paging response to the MSC. For a UE in the connected state, the MME directly returns a response to the MSC, so as to accelerate the call setup. After receiving the paging response about the called UE from the MME, the MSC will transmit a ringing signal to a caller UE. However, for a UE in the light connection, since the connection between the UE and the network is disconnected actually, it takes more time to resume the connection. At this time, the MME considers that the UE is in the connected state. It is not a good user experience when the MME returns a response to the MSC too early, since once the UE is unreachable, the calling user may wonder why the called user does not answer the phone. However, the called user argues why the call is not received. Users will question the network operator, and consider that there is a problem in the network.

A fourth problem: when a MME is overloaded, it may be desirable to offload some UEs in the connected state to other MMEs. The offloading methods are as follows. The MME requests an eNB to release a UE connection, and indicates the UE to initiate a Tracking Area Update (TAU) after releasing the connection, not to provide MME information (such as S-Temporary Mobile Subscriber Identity (TMSI), GUMMEI) when a radio resource control (RRC) connection is re-established, and so on. When selecting a MME for a UE, an eNB may select a MME with lighter load for the UE, according to the principle of load balancing. When the UE is in the light connection state, which is actually disconnected from the network, the eNB receives a disconnect request from the UE.

When the S1 connection and UE context are directly removed, the MME information is not transmitted to the UE, which is contrary to the will of the MME. After the UE connection is resumed, the eNB still selects the currently overloaded MME, based on the information in the UE.

When needing to immediately transmit a MME indication to a UE, multiple processes of the UE must be initiated, such as, a paging connection setup, a connection release, and a connection re-setup. Low efficiency may be resulted from repeatedly establishing the process for releasing signaling.

When transmitting the MME indication to the UE until the UE connection is set up, the UE context is still maintained after the S1 is deleted, which is contrary to the functions of releasing S1.

A UE in the light connection state belongs to "inactive" UE essentially. The overloading state of the MME will not be much alleviated, by offloading such UEs.

The embodiments of the present disclosure will be described in detail in the following. The embodiments are illustrated with attached figures. The same or like reference numerals demonstrate the same or similar components, or components with the same or similar functions. The embodiments described with attached figures are exemplary, which are for use in explaining the present disclosure, instead of limiting the present disclosure.

Technicians in the prior art may understand that, unless otherwise defined, all the terms used here (including technical terms and scientific terms) possess the general same meanings as understood by common technical personnel in the prior art. It should be understood that, those terms defined in a general dictionary should be understood as consistent meanings as in contexts of the existing technologies. Unless is defined in a particular way, terms will not be explained with idealized or too formal meanings.

To facilitate understanding about technical solutions in the present disclosure, it is necessary to put forward the following pilot descriptions for the principle and corresponding terms in the present disclosure.

Some terms in the present disclosure are explained as follows.

In some implementations, the light connection in the following may be denoted with a paging initiated by an RAN, an inactive connection, or an inactive state (e.g., the inactive state in the 5G, operations under the inactive state).

In some implementations, an RAN node may be a base station, an eNB, a NodeB, a central control unit in the RAN, a node distributing unit in the RAN, and so on. In a next generation network, the concept of a node may be virtualized to a function or a unit. The central control unit in the RAN may be connected with multiple node distributing units in the RAN.

In some implementations, a CN node may be a MME, a SGSN, a SGW, a Common Control Network Function (CCNF), an AMF, a System Management Function (SMF), a control node in the CN (e.g., a MME, a CCNF, an AMF), a user plane node in the CN (e.g., a SMF, a SGW, a UPF), a control plane function in the CN, a user plane function in the CN, a control plane unit in the CN, a user plane unit in the CN, and so on. In the next generation network, concept of the node may be virtualized to a function or a unit.

In some implementations, the control node in the CN may be a MME, a SGSN, a control plane function in the CN, a control plane unit in the CN, and so on.

In some implementations, the user plane node in the CN may be a SGW, a SGSN, a user plane function in the CN, a user plane unit in the CN, a network slice, and so on.

In some implementations, the light connection may be denoted with a paging function, which is triggered by the RAN.

In some implementations, whether a UE can perform the light connection may be denoted with whether the UE is appropriate for the light connection.

In some implementations, a connected state of a UE may be denoted with a connection mode of the UE, and the light connection state is denoted with a light connection mode.

Figure 3:
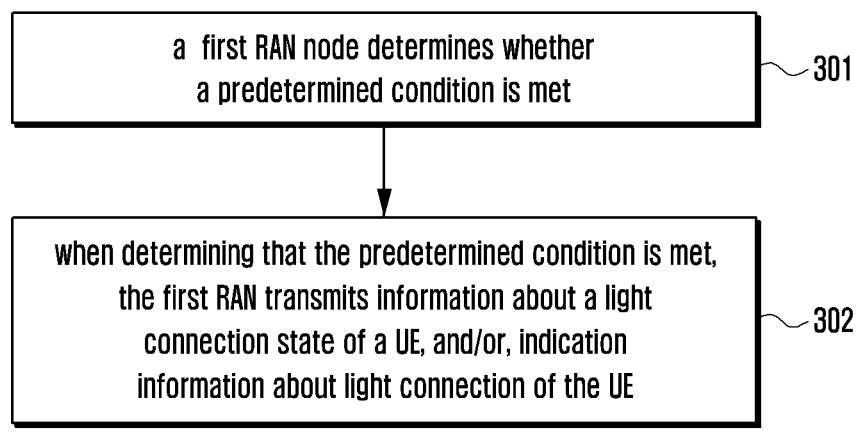
FIG. 3 is a flowchart illustrating a first method for controlling services of a UE in a light connection, in accordance with an embodiment of the present disclosure.

FIG. 3 is a flowchart illustrating a first method for controlling services of a UE in a light connection, in accordance with an embodiment of the present disclosure. As shown in FIG. 3, the method may include the following blocks.

In block 301, a first RAN node determines whether a predetermined condition is met.

Optional, the predetermined condition may include at least one of: state change of a UE connection, change of a UE connection, a light connection decision, a UE is in the light connection state, a UE connection state retrieve request is received.

In some implementations, a UE connection state may include: an idle state (which may be referred to as "disconnected"), a connected state, a light connection (which may be referred to as "an inactive state")).

The UE connection state retrieve request may request to obtain current state of a UE connection. A first RAN node may receive the UE connection state retrieve request from at least one of: a UE, a CN node, a RAN node. It is not difficult to understand that some services or functions may be appropriate for a UE in the connected state and may not be appropriate for a UE in the light connection. When a CN considers that a UE is in the connected state, the UE may be actually in the light connection. Thus, when determining a service or a function of a UE, a CN node may firstly make sure the state of a UE connection (such as, an RRC connection), and then make a decision. For example, when receiving a paging request for a UE from another CN node (e.g., a MSC), for a UE confirmed to be in the connected state, the CN node may immediately return a paging response to the another CN node. For a UE confirmed to be in the light connection state, the CN node may return a paging response to the another CN node until the UE makes a response. There may be multiple ways to confirm the state of the UE connection, for example, the CN node requests to retrieve the state of the UE connection, or the first RAN proactively reports the state of the UE connection.

Optional, the UE connection state retrieve request may also be represented with at least one of: whether the UE currently is in the light connection (which may also be referred to as an inactive state).

Preferably, the state change of the UE connection may include, without limitation, at least one of: change of light connection state of the UE. The change of light connection state of the UE may include at least one of the following.

1) Enter the light connection from another state. When a UE enters the light connection from the connected state, a connection between the UE and an RAN can be disconnected or become inactive, meanwhile a UE connection between the RAN and a CN can be maintained.

2) Leave the light connection, and access another state. When a UE enters the idle state from the light connection, a connection associated with the UE in the light connection between an RAN and a CN may be released.

Preferably, the change of the UE connection may include, without limitation, at least one of: a connection setup, a connection release, entering the light connection, leaving the light connection, a connection suspended, or a connection resume. When a UE enters the light connection, a connection between the UE and an RAN can be disconnected or become inactive, while a UE connection between the RAN and a CN can be maintained. Leaving the light connection may be denoted with at least one of: a connection setup, a connection release, a connection suspended, or a connection resume.

Preferably, the light connection decision may be as follows. A first RAN node determines that a UE can perform the light connection. In some implementations, when determining that a UE can perform the light connection, a first RAN node transmits indication information for light connection of the UE.

Preferably, a UE in the light connection state may include, without limitation, at least one of the following. The UE disconnects the light connection between the UE and the first RAN, and the UE accesses a second RAN node. A first RAN node receives control plane signaling about the UE. In some implementations, a first RAN node may learn that a UE accesses a second RAN node, by means of at least one of: the first RAN node receives and obtains a UE context retrieve request from the second RAN node, or, the first RAN node receives access information of the UE from the second RAN node.

Preferably, the predetermined condition may be as follows. After receiving the control plane signaling about the UE, the first RAN node learns that the UE accesses the second RAN node. In some implementations, after receiving the control plane signaling about the UE, the first RAN node initiates a UE paging, and learns that the UE accesses a second RAN node. The second RAN node transmits a UE context retrieve request to the first RAN node. Alternatively, the control plane signaling may include at least one of: a bearer setup request, a bearer modify request, a bearer release request, a transport message for downlink control plane data (such as NAS), a data session setup request, a data flow context setup request.

In block 302, when determining that the predetermined condition is met, the first RAN node transmits information about light connection state of the UE, and/or, indication information about the light connection of the UE.

In some implementations, the first RAN node may transmit information about light connect state of the UE, and/or, indication information about light connection of the UE, to a CN node, or the UE, or the second RAN node. The first RAN node may be an RAN node serving the UE, or an RAN node storing the UE context. Preferably, the light connection may refer to the following state. The connection between a UE and an RAN is disconnected or becomes inactive, while the UE connection between the RAN and the CN can be maintained. The UE associated connection between the RAN and the CN may refer to at least one of: the UE associated connection between the RAN and the control plane of the CN, or the UE associated connection between the RAN and the user plane of the CN.

Optional, the information about light connection state of the UE may be denoted with light connection indication of the UE. The light connection indication of the UE may include at least one of: an indication for entering or being in the light connection state, or an indication for leaving the light connection state. The indication for leaving the light connection state may be denoted with entering another state, such as, an indication for entering or being in the connected state, an indication for entering or being in the idle state, a UE identity (such as Resume ID) of a UE in the light connection. In an implementation, the light connection state may be denoted with a light connection mode, a new RRC state, or a new ECM state. In an implementation, the UE ID of the UE in the light connection is configured by an RAN, which configures the light connection for the UE.

Optional, the information about light connection state of the UE may be carried by messages, which correspond to different light connections of the UE. Such messages may include, without limitation, at least one of the following.

1) A first RAN node informs that the UE enters the connected state or leaves the state other than the connected state (such as light connection state, or idle state) by transmitting a message, which is used to carry UE message (such as NAS message), such as an uplink NAS transport message.

2) A first RAN node informs that the UE enters the connected state or leaves the state other than the connected state (such as light connection state, or idle state) by transmitting a UE access related message, such as, an initial UE access message, a UE context resume, a path switch request.

3) A first RAN node informs that the UE enters the idle state or leaves the state other than the idle state (such as light connection state, or connected state) by transmitting a message which is relevant to a UE connection release or a UE connection suspended, such as, a UE context release request, a UE context suspending request.

4) A first RAN node informs that the UE enters the light connection state by transmitting a signaling message triggered at RAN side, which is about the UE entering the light connection 5) A first RAN node informs that the UE leaves the light connection state by transmitting a signaling message triggered at RAN side.

Optional, the indication information about light connection of the UE indicates whether the UE can perform the light connection.

Optional, when determining that the following predetermined condition is met: the first RAN node receives control plane signaling about the UE, and learns that the UE accesses a second RAN node. At this time, the first RAN node may perform at least one of:

1) not respond to the control plane signaling, for example, neither return a response message, nor return a reject message;

2) reject the control plane signaling related to the UE in the light connection state; in some implementations, a message rejecting the control plane signaling may be at least one of: a bearer setup reject, a bearer modify request reject, a bearer release reject, a data session reject, a data flow context setup reject;

3) transmit relevant reasons for rejection; the reasons for rejection may include at least one of: a UE is switching to another RAN node, a UE is in the light connection, request to re-transmit the control plane signaling about the UE to a second RAN node, request not to reject the received control plane signaling;

4) transmit information about light connection state of the UE; the information about light connection state of the UE may be represented by the reasons for rejection;

5) request to re-transmit the control plane signaling about the UE to the second RAN node, e.g., when receiving the control plane signaling about the UE, a CN node may re-transmit the control plane signaling about the UE to the second RAN node, after receiving the path switch request from the second RAN node;

6) request not to reject the received control plane signaling;

7) indicate that the UE is switching to another RAN node;

8) transmit the identity of the second RAN, or an identity of an RAN node to which the UE is going to switch.

Optional, the first RAN node transmits foregoing information to the CN node.

Figure 4:
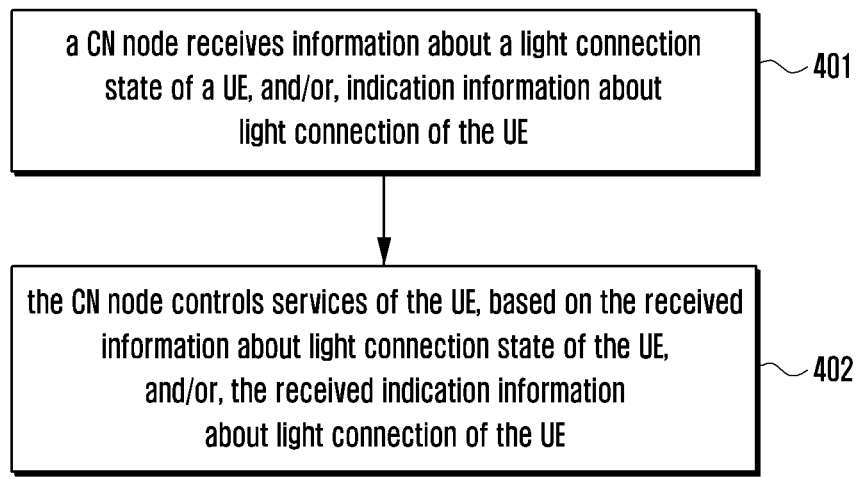
FIG. 4 is a flowchart illustrating a second method for controlling services of a UE in a light connection, in accordance with an embodiment of the present disclosure.

FIG. 4 is a flowchart illustrating a second method for controlling services of a UE in a light connection, in accordance with an embodiment of the present disclosure. As shown in FIG. 4, the method includes the following blocks.

In block 401, a CN node, or a UE, or a second RAN node receives information about light connection state of a UE, and/or, indication information of light connection of the UE.

In some implementations, a UE may receive the information about light connection state of the UE, and/or, indication information of light connection of the UE from the RAN (such as, the first RAN node), or the CN.

In some implementations, a second RAN node may receive the information about light connection state of the UE, and/or, indication information of light connection of the UE from the RAN (such as, the first RAN node), or the CN.

In some implementations, a CN receives the information about light connection state of the UE, and/or, the indication information about light connection of the UE, from an RAN (such as a first RAN node), or another CN, or the UE.

The information about light connection state of the UE has already been described in block 302, which is not repeated here.

The indication information about light connection of the UE has already been described in block 302, which is not repeated here.

Optional, the information about light connection state of the UE may be the light connection of the UE, as described in block 302, which is not repeated here.

Optional, the information about light connection state of the UE, which is transmitted to the CN node, may be represented by different signaling messages. Such different messages and different light connections of the UE are in a one-to-one correspondence. After receiving a specific message, a UE's light connection is learned. The foregoing scene may include, without limitation, at least one of the following.

1) The CN node learns that the UE enters the connected state or leaves the state other than the connected state (such as light connection state, or idle state) by reception of a message, which is used to piggybacked UE message (such as NAS message), such as an uplink NAS transport message.

2) The CN node learns that the UE enters the connected state or leaves the state other than the connected state (such as light connection state, or idle state) by reception of a UE access related message, such as, an initial UE access message, a UE context resume, a path switch request.

3) The CN node learns that the UE enters the idle state or leaves the state other than the idle state (such as light connection state, or connected state) by reception of a message which is relevant to a UE connection release or a UE connection suspended, such as, a UE context release request, a UE context suspending request.

4) The CN node learns that the UE enters the light connection state by reception of a signaling message from RAN or UE.

5) The CN node learns that the UE leaves the light connection state by reception of a signaling message from RAN or UE.

Optional, a UE may be paged and informed to leave the light connection state or to enter the idle state. For example, when the UE associated connection between the RAN and the CN is released, the UE is paged by the first RAN node, and is informed to enter the idle state. The paging reason may be at least one of: the UE associated connection between the RAN and the CN is released, the UE leaves the light connection state, or the UE enters the idle state.

Optional, the indication information about light connection of the UE may be represented by a signaling message, and the signaling message may include, without limitation, at least one of:

The CN node, or the UE, or the second RAN node learns that the RAN node (such as, the first RAN node) plans or determines to turn UE into light connection by reception of a signaling message related to the indication information about light connection of the UE from the RAN (such as, the first RAN node).

In block 402, the CN node, or the UE, or the second RAN node controls services of the UE, based on the received information about light connection state of the UE, and/or, the received indication information about light connection of the UE.

In an implementation, the CN node, or the UE, or the second RAN node may learn that whether the UE is in the light connection, based on the received information about light connection state of the UE. In another implementation, the CN node, or the UE, or the second RAN node may learn that whether the UE can perform the light connection, based on the received indication information about light connection of the UE. When the UE is in the light connection, or learning that the UE can perform the light connection, the CN node, or the UE, or the second RAN node performs specific service controlling on the UE in the light connection. For different services or functions, the CN node, or the UE, or the second RAN node may perform the following specific operations in the light connection state.

The light connection controlling performed by the CN node on the UE may include, without limitation, at least one of the following.

1) The CN node may buffer control plane data (such as NAS signaling) of the UE.

The CN node may transmit a paging request for the UE to an RAN node. Until the connection between the UE and the RAN is set up or resumed, the control plane signaling in the CN is transmitted to the UE via the RAN.

after learning that the UE connection is resumed, and the path is switched to a second RAN node, the CN node may immediately re-transmit to the second RAN node the control plane signaling, which is supposed to be transmitted to the UE.

2) When the UE is called as a callee, the paging request coming from circuit domain may not be immediately responded.

Until the connection between the UE and the RAN is set up or resumed and the control plane node in the CN receives an extended PDN connection setup request about the call, the paging request coming from the circuit domain can be responded, 3) When the CN node is overloaded, and considering to offload some UEs to other CN nodes, 1) the CN node may not consider offloading UEs in the light connection state. There is no interaction between a UE in the light connection and a network. Subsequently, loads of the CN will not be greatly alleviated by releasing these UEs. 2) The CN node may firstly consider offloading UEs in the connected state, and then consider offloading UEs in the light connection. 3) When offloading UEs in the light connection, the UE associated connection between the CN and the RAN may be directly released, and location update of the UE may be not required.

4) The CN node may maintain the UE associated connection between the RAN and user plane of the CN. When downlink data of the UE arrives, the data may be directly transmitted from the user plane of the CN to the RAN node.

5) The CN node may maintain the UE associated connection between the RAN and the control plane of the CN.

6) When the control plane of the CN needs to page the UE, the CN node may only transmit the paging to the RAN node serving the UE.

7) After generating the control plane signaling, the CN node may directly transmit the control plane signaling to the RAN. Subsequently, the RAN may trigger the paging for the UE. The CN may properly extend retransmission delay of control plane data.

8) The control plane node of the CN does not reject the received control plane signaling related to the UE.

9) The control plane node in the CN re-transmits control plane signaling to the second RAN node, which is accessed by the UE. In some implementations, after the CN transmits the control plane signaling to the first RAN node, when receiving a control plane signaling reject message, and reasons for refusal are at least one of: the UE is switching, the UE is in the light connection, requesting to re-transmit the control plane signaling about the UE to the second RAN node, requesting not to reject the received control plane signaling; the CN node may transmit the control plane signaling to the RAN accessed by the UE, when receiving a path switch (e.g., a path switch request), which indicates to switch to the second RAN node accessed by the UE.

10) When generating the control plane signaling, the CN may transmit the control plane signaling after the UE enters the connected state. The UE may enter the connected state from the RAN node, which maintains the UE context, or enter the connected state from a new RAN node.

In some implementations, some functionalities of UEs in the light connection handled by the CN node may be the same as, or similar to functions of UEs in the idle state handled by the CN node, such as 1), 2), 3).

In other implementations, some functionalities of UEs in the light connection handled by the CN node may be the same as, or similar with functions of UEs in the connected state handled by the CN node, such as 4), 5), 6), 7).

The process for the UE to perform the light connection control on the UE may include, without limitation, at least one of:

1) the UE may initiate a RAN location update (which may be periodical);

2) some functionalities of a UE in the light connection may be the same as, or similar to functionalities of a UE in the idle state, for example, monitor paging, it is necessary to enter the connected state when there is transmission of non-small data;

3) some functionalities of a UE in the light connection may be the same as, or similar to functionalities of a UE in the connected state, for example, it is not necessary to initiate a service request on the NAS layer when transmitting uplink data.

Figure 5:
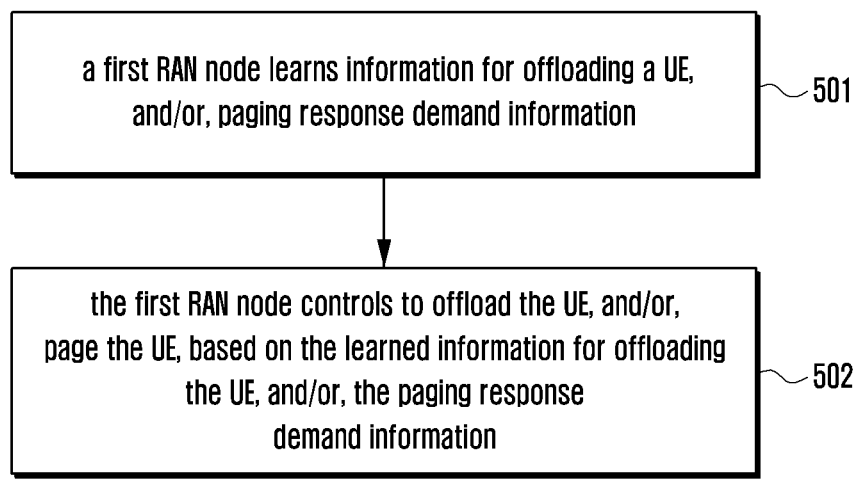
FIG. 5 is a flowchart illustrating a third method for controlling services of a UE in a light connection, in accordance with an embodiment of the present disclosure.

FIG. 5 is a flowchart illustrating a third method for controlling services of a UE in a light connection, in accordance with an embodiment of the present disclosure. The foregoing flowchart describes the process for a first RAN node to offload and page a UE in the light connection state. As shown in FIG. 5, the process includes the following blocks.

In block 501, a first RAN node learns information for offloading a UE, and/or, paging response demand information.

In some implementations, the first RAN node receives information for offloading the UE, or paging response demand information from a first CN node, a UE or a second RAN node. The first CN node may be a CN node serving the UE currently. The first RAN node may be a RAN node storing the UE context, or may be a RAN node other than the RAN node storing the UE context. In some implementations, the first RAN node is a RAN node storing the UE context. The first RAN node may receive the foregoing information from the first CN node. In some implementations, the first RAN node is a RAN node other than the RAN node storing the UE context. The second RAN node is a RAN node storing the UE context. The first RAN node may receive the foregoing information from the second RAN node.

Optional, the information for offloading the UE may include at least one of the following.

1) Release the UE connection, e.g., release the connection between the UE and the RAN accessed by the UE, or release the UE associated connection between the first RAN node and the CN;

2) Request the UE to initiate location update (e.g., trigger TAU to the CN node), such as, for load balancing. Requesting the UE to initiate the location update may be demonstrated by at least one of the following.

a) Trigger the UE to initiate the location update, by allocating a new tracking area (TA) identity for the UE.

b) Indicate that the reason for releasing the UE connection is the requested location update.

c) Indicate the UE to initiate the location update.

3) Request not to provide the identity of the first CN node. For example, when requesting a UE to transmit a connection (such as an RRC connection, to transmit a location update request) setup request to an RAN node (which may be a first RAN node, or another RAN node), the UE does not provide the identity of the first CN node (which may be an identity of a first RAN node, or may be an identity allocated by the first RAN for the UE). At this time, an RAN node accessed by the UE may re-select a CN node for the UE, based on the principle of load balancing. Requesting the UE not to provide the identity of the first RAN node may be represented by using at least one of the following.

a) Indicate not to provide the identity of the first CN node, when the UE connection is set up.

b) Indicate that the reason for releasing the UE connection is the location update due to load balancing;

c) Indicate that the reason for releasing the UE connection is requesting the UE to initiate the location update.

Optional, the paging response demand information may include at least one of: whether paging response is needed, paging reason. The paging reason may include at least one of: arrival of downlink data, being called, arrival of control plane signaling, releasing of light connection (the UE associated connection between RAN and CN is released), entering the idle state by a UE, arrival of a bearer setup request, arrival of a bearer modify request, arrival of a bearer release request, arrival of a session setup request, arrival of a session modify request, or arrival of a session release request. In some implementations, a UE does not need to respond to paging for some paging reasons, for example, load balancing related located update, releasing a light connection. A UE needs to respond to paging for some other paging reasons.

In block 502, on the basis of learned information for offloading the UE, and/or, paging response demand information, the first RAN node performs control, which may include at least one of the following.

1) Release the UE associated connection between the first RAN node and the CN. In an implementation, the UE associated connection between the first RAN node and the CN may be released, after the information for offloading the UE is transmitted to the UE. For example, the information for offloading the UE is carried by a paging message, or an RRC release message, after the paging message or RRC release message is transmitted to the UE, the UE associated connection between the first RAN node and the CN is released.

2) Release the UE connection between the first RAN and the CN, while maintain UE context;

3) When the connection between the UE and the first RAN has been released, the first RAN may initiate a paging for the UE, and may also request a third RAN to initiate the paging for the UE.

4) Transmit the information for offloading the UE to the UE. In an implementation, when releasing the connection between the UE and the first RAN, the first RAN node transmits the information for offloading the UE to the UE. In another implementation, the information for offloading the UE is added to the paging for the UE by the first RAN node.

5) Transmit the paging response demand information to the UE. In an implementation, the information for offloading the UE is added to the paging for the UE by the first RAN node.

6) Transmit the information for offloading the UE to the third RAN node. In an implementation, when transmitting a paging request to the third RAN node, the first RAN node transmits the information for offloading the UE to the third RAN node. When the UE accesses the third RAN node, the third RAN node may offload the UE, based on the learned information for offloading the UE, e.g., select a CN node based on load balancing;

7) Transmit the paging response demand information to the third RAN node. In an implementation, when transmitting a paging request to the third RAN node, the first RAN node transmits the paging response demand information to the third RAN node.

In an implementation, when the UE is in the light connection, or when learning that the UE can perform the light connection, the first RAN node performs control, based on the learned information for offloading the UE, and/or, the paging response demand information.

Figure 6:
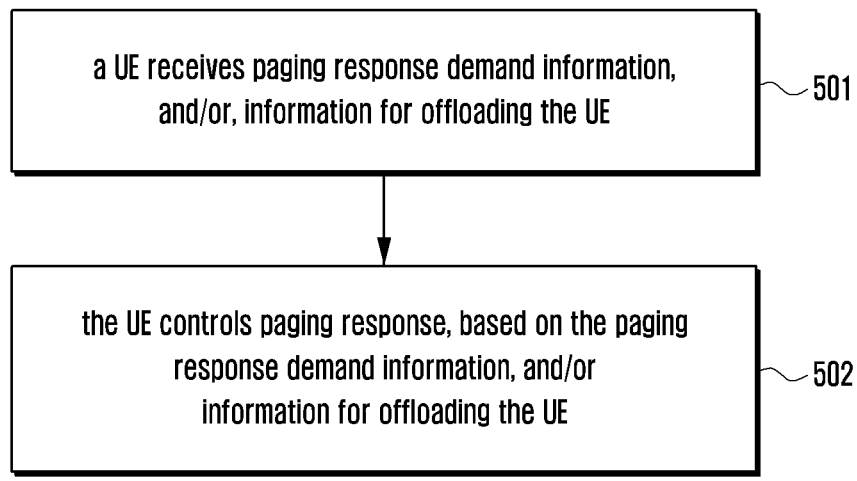
FIG. 6 is a flowchart illustrating a fourth method for controlling services of a UE in a light connection, in accordance with an embodiment of the present disclosure.

FIG. 6 is a flowchart illustrating a fourth method for controlling services of a UE in a light connection, in accordance with an embodiment of the present disclosure. As shown in FIG. 6, the method includes the following blocks.

In block 601, a UE receives paging response demand information, and/or, information for offloading the UE.

In some implementations, the paging response demand information is received, when receiving a paging from an RAN.

Optional, the paging response demand information may include at least one of: whether a paging response is needed, or a paging reason. The paging reason may include at least one of: arrival of downlink data, being called, arrival of control plane signaling, releasing the light connection (the UE connection between the RAN and the CN is released), entering the idle state by the UE, arrival of a bearer setup request, arrival of a bearer modify request, arrival of a bearer release request, arrival of a session setup request, arrival of a session modify request, or arrival of a session release request. In some implementations, a UE does not need to respond to paging for some paging reasons, e.g., location update and load balancing, releasing the light connection. A UE needs to respond to the paging for some other paging reasons.

The information for offloading the UE has been described in block 501, which is not repeated here.

In block 602, the UE controls a paging response, based on the paging response demand information, and/or, information for offloading the UE.

In some implementations, the paging response may be to request a network to set up a connection, or resume a connection by the UE.

In some implementations, when the UE is in the light connection, on the basis of the paging response demand information, and/or, the information for offloading the UE, the UE controls the paging response.

Preferably, the paging response control may include at least one of: the UE determines whether to return the paging response, on the basis of whether the paging response is needed; the UE determines whether to return the paging response, based on the information for offloading the UE; or, the UE determines whether to return the paging response, based on the paging reason.

In some implementations, when the paging response demand information indicates that the paging response is not needed, the UE does not initiate the paging response.

In some implementations, when receiving the information for offloading the UE, the UE does not initiate the paging response.

In some implementations, due to some paging reasons without the need of paging response, the UE may not initiate the paging response, for example, when the paging reason indicates that the UE connection between RAN and CN is released, or indicates that the UE enters the idle state, the UE may enter the idle state without initiating the paging response; when the paging reason indicates to offload the UE, or to update location due to load balancing, the UE may not initiate the paging response.

Figure 7:
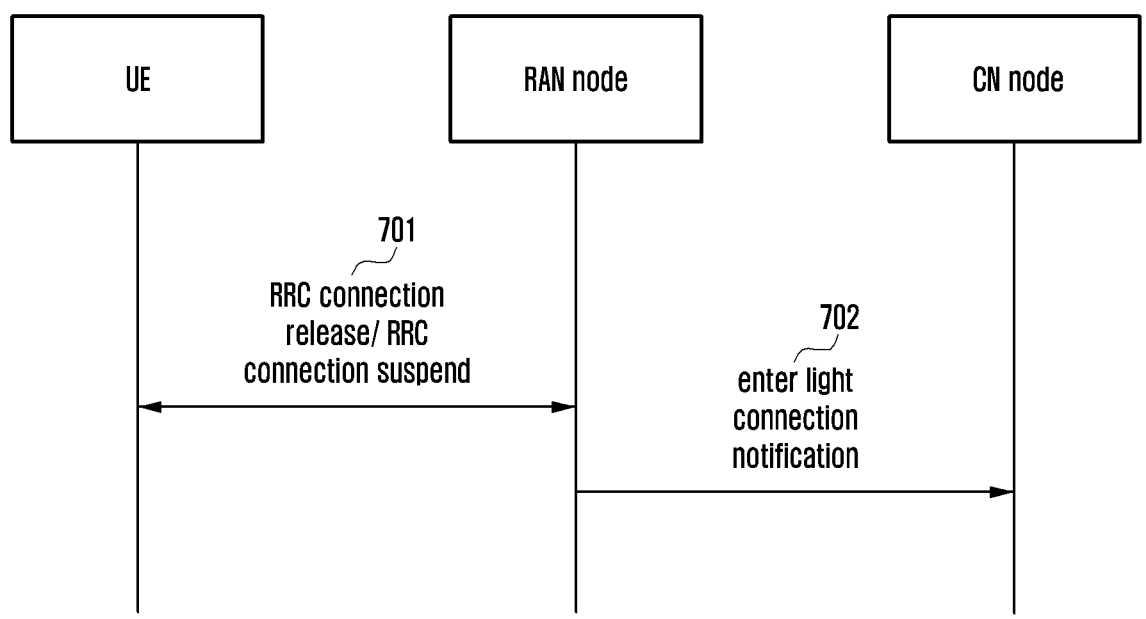
FIG. 7 is a flowchart illustrating a method for controlling services of a UE in a light connection, in accordance with a first embodiment of the present disclosure.

FIG. 7 is a flowchart illustrating a method for controlling services of a UE in a light connection, in accordance with a first embodiment of the present disclosure. FIG. 7 illustrates a process for a UE to change from a connected state to a light connection state. As shown in FIG. 7, the method includes the following blocks.

In block 701, an RRC connection between a UE and a first RAN node is released, inactive or suspended. The first RAN node determines to maintain a UE connection between an RAN and a CN, or in other words, the first RAN node configures the UE to perform a light connection.

In block 702, there may be two ways for the first RAN node to inform the CN that the UE is in the light connection. The first RAN node may transmit a light connection state notification to a CN node, or transmit information about light connection state of the UE, so as to indicate that the UE is in the light connection state. The process for transmitting the information about light connection state of the UE has been described in block 302, which is not repeated here.

Figure 8:
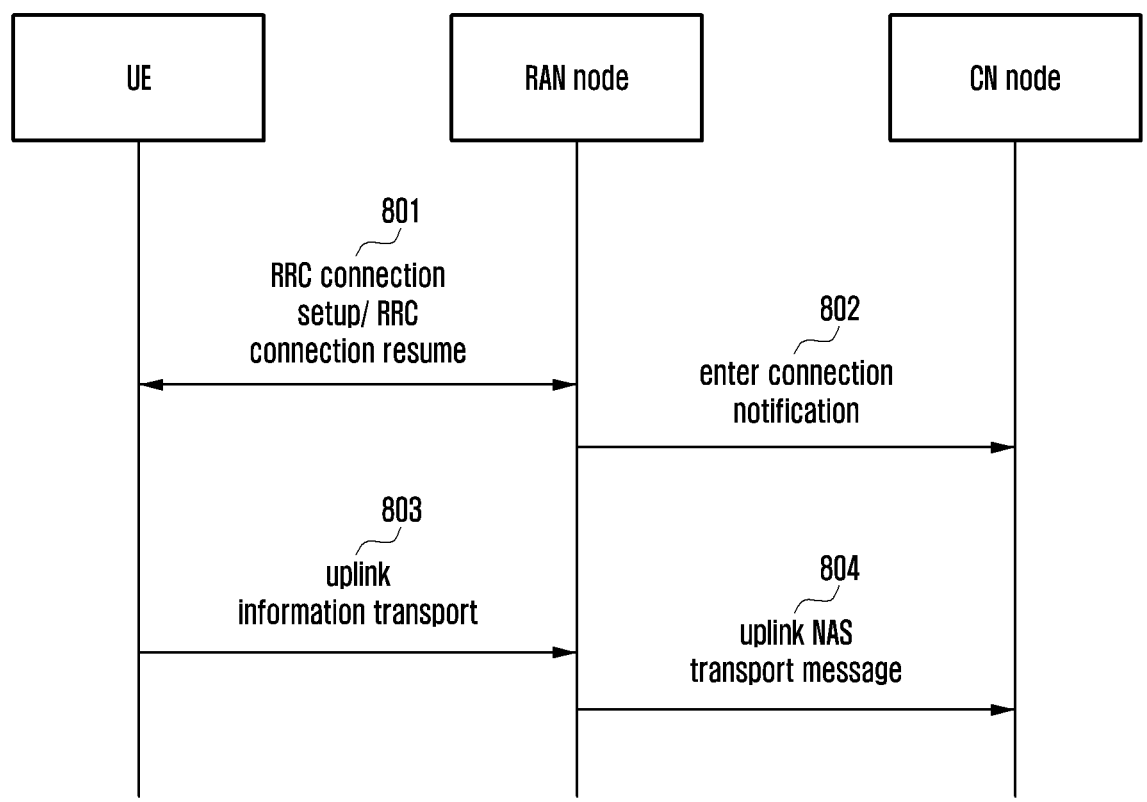
FIG. 8 is a flowchart illustrating a method for controlling services of a UE in a light connection, in accordance with a second embodiment of the present disclosure.

FIG. 8 is a flowchart illustrating a method for controlling services of a UE in a light connection, in accordance with a second embodiment of the present disclosure. FIG. 8 illustrates a process for a UE to change from a light connection state to a connected state. As shown in FIG. 8, the method includes the following blocks.

In block 801, an RRC connection between a UE in a light connection state and a first RAN node is set up, or resumed. There may be two ways for an RAN node to inform the UE to resume the connection, which are respectively described in blocks 802, 803 and 804.

In block 802, the first RAN node may immediately transmit relevant information about connected state of the UE, or information about light connection state of the UE, to a CN node, and indicate that the UE is in the connected state. The information about light connection state of the UE has been described in block 302, which is not repeated here.

In block 803, the UE transmits an uplink information transport message to the first RAN node.

In block 804, after receiving the uplink information transport message, the first RAN node transmits an uplink NAS transport message to the CN node. After receiving such uplink NAS transport message, the CN node may support the UE in the connected state.

Figure 9:
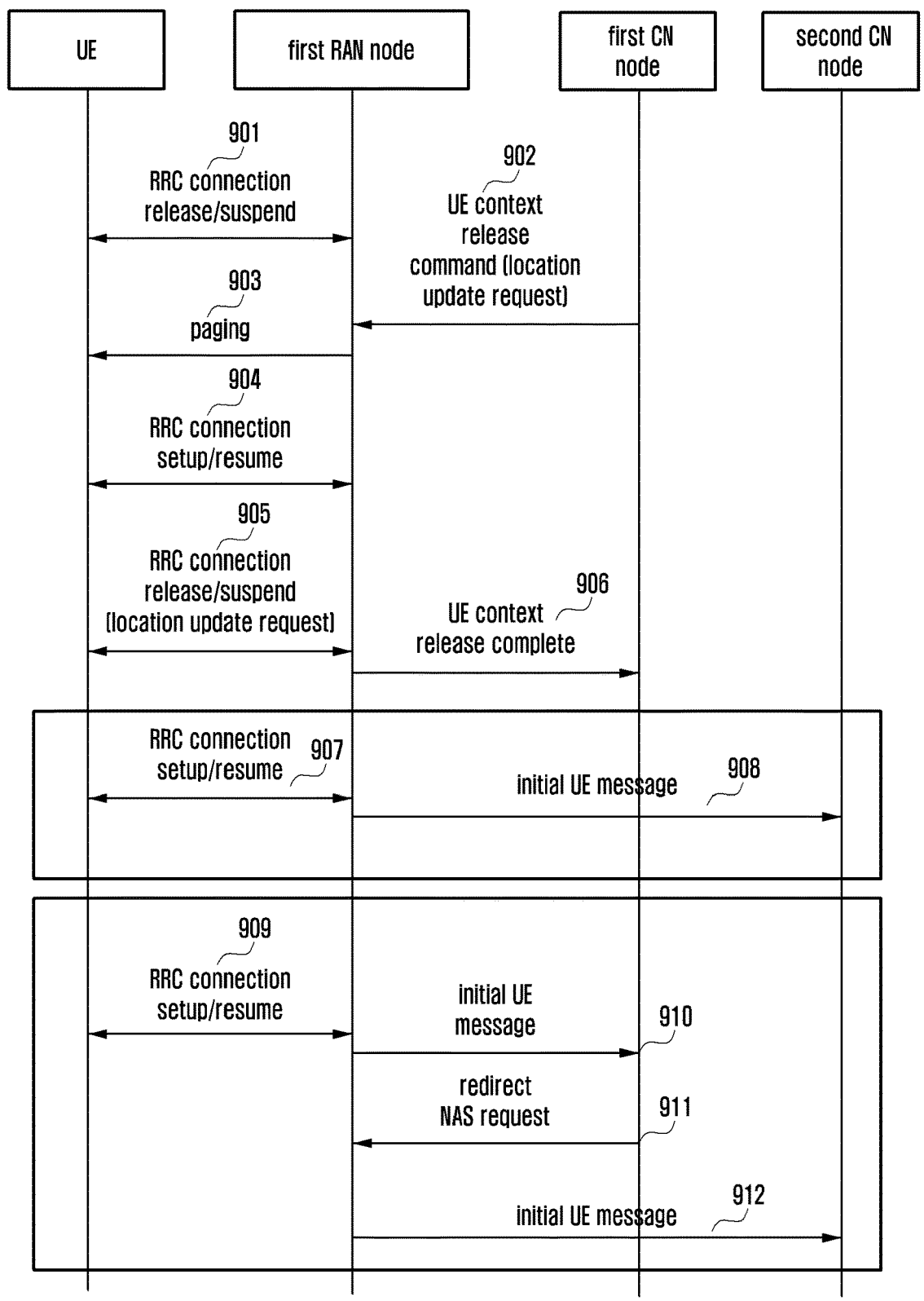
FIG. 9 is a flowchart illustrating a method for controlling services of a UE in a light connection, in accordance with a third embodiment of the present disclosure.
Figure 10:
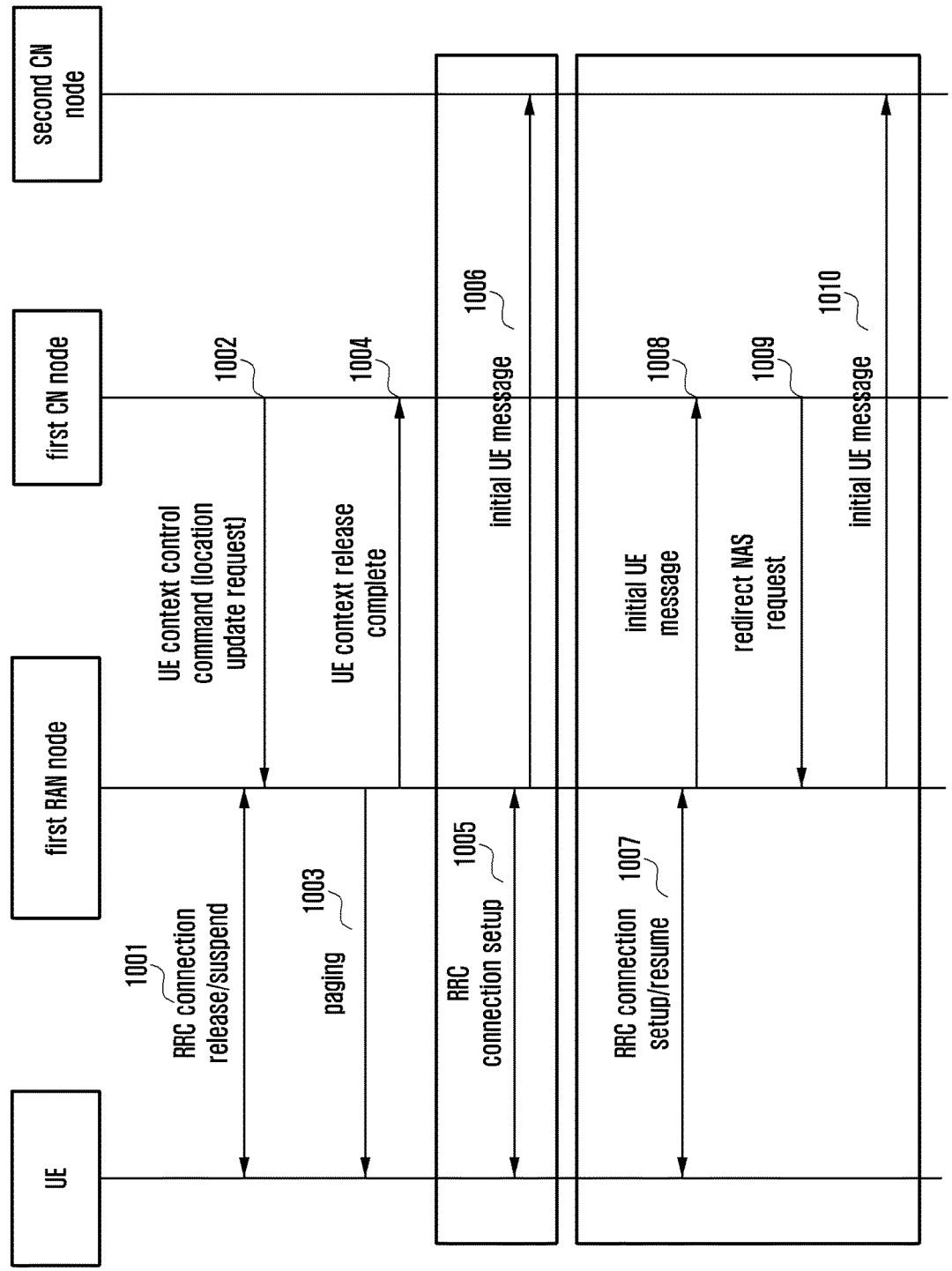
FIG. 10 is a flowchart illustrating a method for controlling services of a UE in a light connection, in accordance with a fourth embodiment of the present disclosure.
Figure 11:
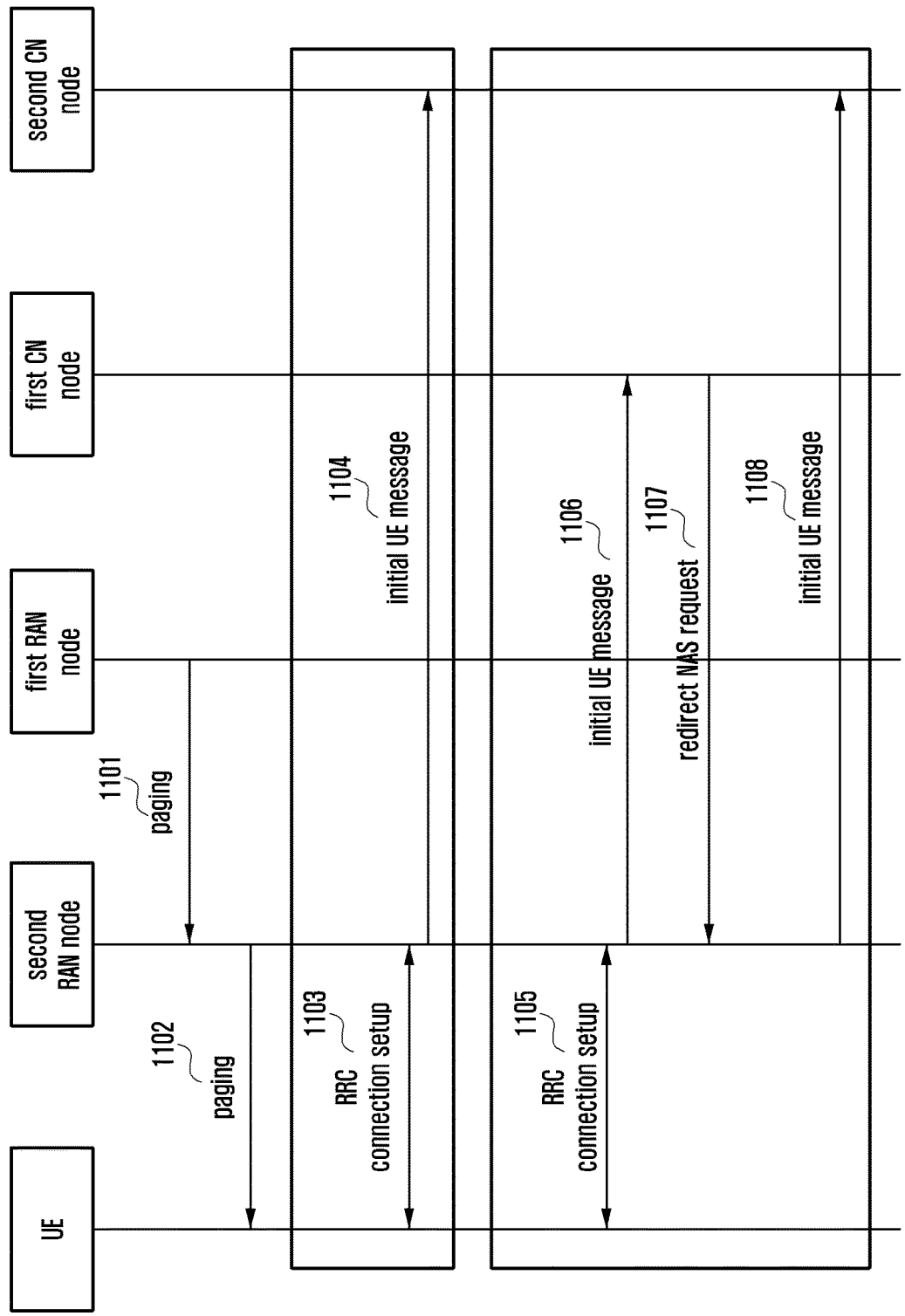
FIG. 11 is a flowchart illustrating a method for controlling services of a UE in a light connection, in accordance with a fifth embodiment of the present disclosure.

FIG. 9-FIG. 11 are flowcharts illustrating several processes, which are executed after an RAN receives information for offloading a UE from a CN node, in accordance with embodiments of the present disclosure.

FIG. 9 is a flowchart illustrating a method for controlling services of a UE in a light connection, in accordance with a third embodiment of the present disclosure. As shown in FIG. 9, the method includes the following blocks.

In block 901, an RRC connection between a UE and a first RAN node is released, inactive or suspended. The first RAN node determines to maintain a UE connection between an RAN and a CN, or the first RAN node configures the UE to perform a light connection.

In block 902, congestion occurs in the CN, and a CN node plans to offload the UE, that is, transfer the UE to another CN node. The CN node transmits a UE context release command to the first RAN node. Optional, the UE context release command carries information for offloading the UE. The information for offloading the UE has been described in block 501, which is not repeated here.

In block 903, the first RAN initiates a paging for the UE. The first RAN transmits a paging request about the UE to a second RAN node. Optional, the paging request carries the information for offloading the UE (as described in block 501, which is not repeated here). After receiving the paging and learning the information for offloading the UE, the UE may not initiate to set up or resume the connection.

In block 904, an RRC connection between the UE and the first RAN node is set up, or resumed. There are two ways for offloading the UE to another RAN node, which are respectively described in blocks 907 to 908 and blocks 909 to 912.

In block 905, the first RAN releases the UE connection. Optional, the RRC connection release carries the information for offloading the UE (as described in block 501, which is not repeated here).

After the UE connection is released and connection setup is re-initiated, there may be two ways for the UE to communicate, which are respectively described in blocks 907 to 909 and blocks 909 to 912.

In block 906, the first RAN transmits a UE context release complete to the CN node. Block 906 may be executed before block 904, or block 906 may be executed before block 903.

In block 907, the UE transmits an RRC connection setup to the first RAN, in which the RRC connection setup does not carry an identity of a first CN node, or the identity allocated for the UE by the first CN node. The first RAN node selects a second CN node for the UE, based on the principle of load balancing.

In block 908, the first RAN node transmits an initial UE message to the second CN node, in which the initial UE message carries a location update request of the UE.

In block 909, the UE transmits an RRC connection setup to the first RAN, in which the RRC connection setup carries the identity of the first CN node, or the identity allocated for the UE by the first CN node. The first RAN node selects the second CN node for the UE.

In block 910, the first RAN node transmits an initial UE message to the first CN node, in which the initial UE message carries the location update request of the UE.

In block 911, the first CN node re-directs the UE to the second CN node, and transmits a redirect request to the first RAN.

In block 912, the first RAN node transmits an initial UE message to the second CN node.

Until now, the UE accesses the second CN node, and the embodiment is terminated.

FIG. 10 is a flowchart illustrating a method for controlling services of a UE in a light connection, in accordance with a fourth embodiment of the present disclosure. As shown in FIG. 10, the method includes the following blocks.

Blocks 1001 and 1002 are the same as blocks 901 and 902, which are not repeated here.

In block 1003, a first RAN initiates a paging for a UE. The paging message carries information for offloading the UE (as described in block 501, which is not repeated here).

The first RAN transmits a paging request for the UE to a second RAN node. Optional, the paging request carries the information for offloading the UE (as described in block 501, which is not repeated here).

After a UE connection is released and a connection setup is re-initiated, there may be two ways for the UE to communicate, which are respectively described in blocks 1005 to 1006 and blocks 1007 to 1009.

In block 1004, the first RAN transmits a UE context release complete to a CN node. Block 1004 may be performed before block 1003.

Blocks 1005 to 1010 are respectively consistent with blocks 907 to 912, which are not repeated here.

FIG. 11 is a flowchart illustrating a method for controlling services of a UE in a light connection, in accordance with a fifth embodiment of the present disclosure. As shown in FIG. 11, the method includes the following blocks.

In block 1101, a second RAN node receives a paging request for a UE from a first RAN. Optional, the paging request carries information for offloading the UE (as described in block 501, which is not repeated here).

In block 1102, the second RAN node initiates a paging request for the UE. Optional, the paging request carries the information for offloading the UE (as described in block 501, which is not repeated here).

After receiving the paging connection setup by the UE, there may be two ways to offload the UE, which are respectively described in blocks 1103 to 1104 and blocks 1105 to 1107.

In block 1103, an RRC connection between the UE and the second RAN node is set up, or resumed. The RRC message does not carry an identity of a first CN node, or the identity allocated for the UE by the first CN node. The second RAN node selects the second CN node for the UE, based on the principle of load balancing.

In block 1104, the second RAN node transmits an initial UE message to the second CN node, in which the initial UE message carries a location update request of the UE.

In block 1105, the UE transmits an RRC connection setup to the second RAN, in which the RRC connection setup carries the identity of the first CN node, or the identity allocated for the UE by the first CN node. The second RAN node selects the second CN node for the UE.

In block 1106, the second RAN node transmits an initial UE message to the first CN node.

In block 1107, the first CN node redirects the UE to the second CN node, and transmits a redirect request to the first RAN.

In block 1108, the second RAN node transmits an initial UE message to the second CN node.

Until now, the UE accesses the second CN node, and the embodiment is terminated.

Figure 16:
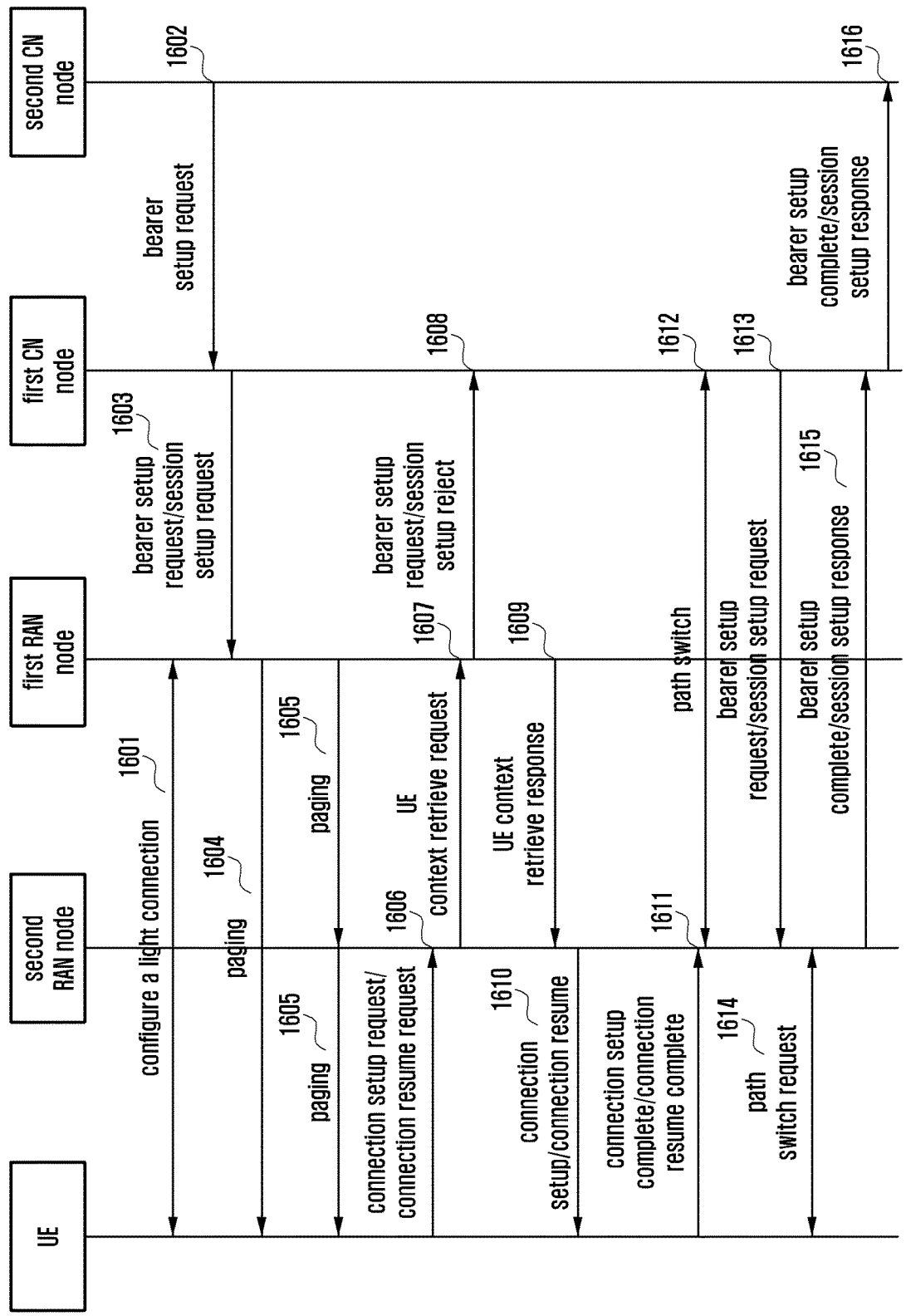
FIG. 16 is a flowchart illustrating a method for controlling services of a UE in a light connection, in accordance with a sixth embodiment of the present disclosure.
Figure 17:
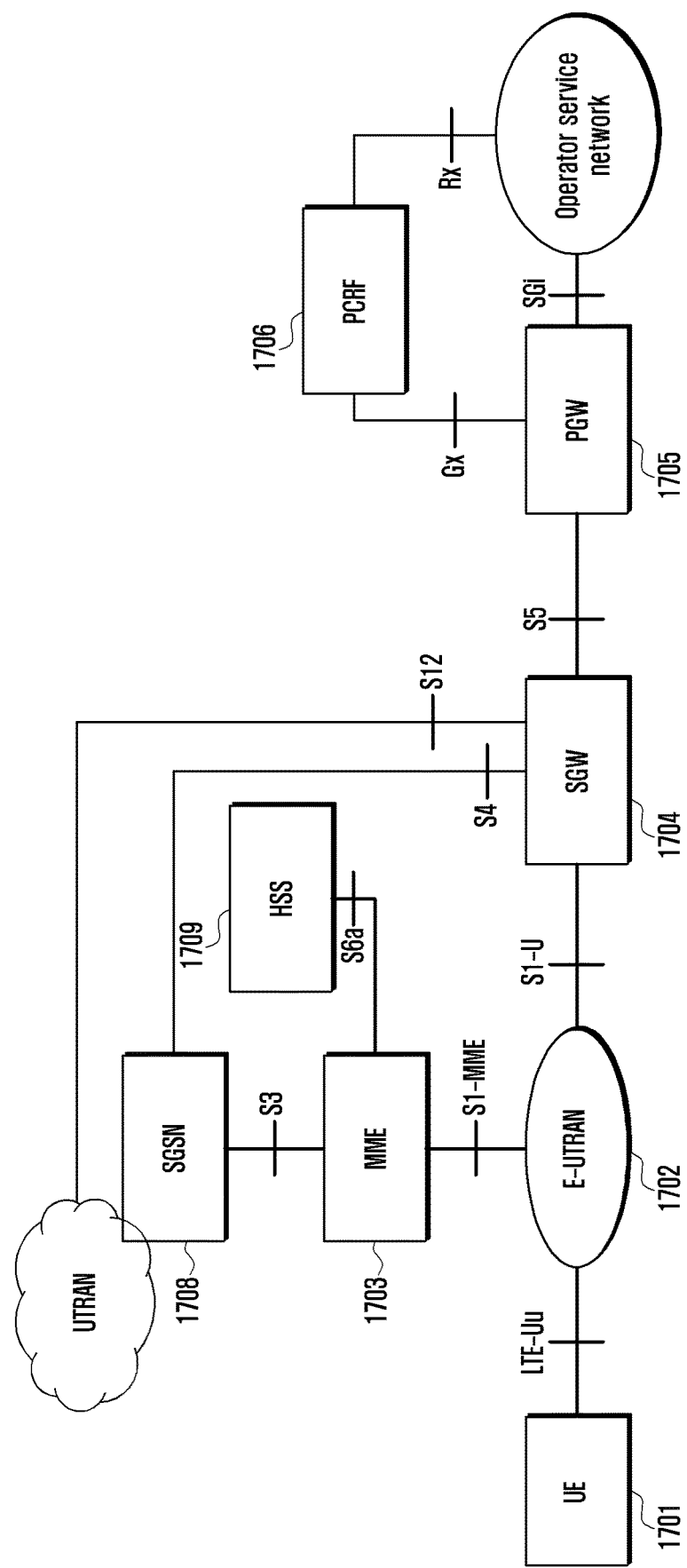
FIG. 17 is a schematic diagram illustrating existing system architecture for an SAE.
Figure 18:
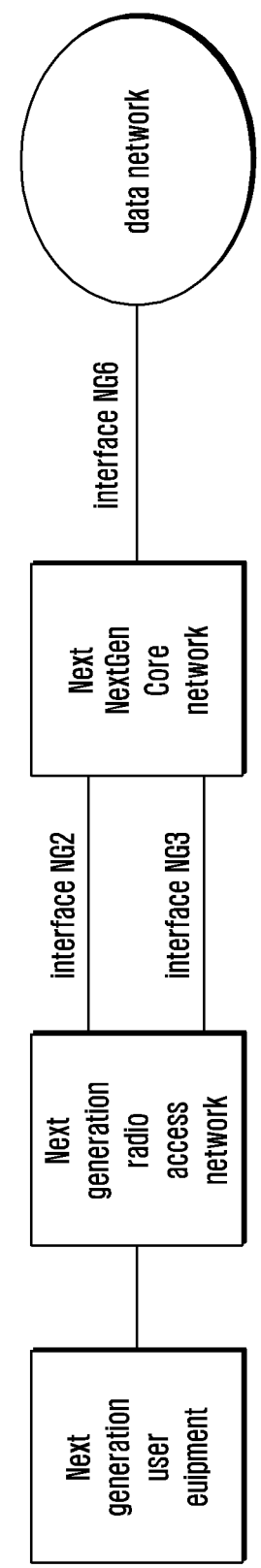
FIG. 18 is a schematic diagram illustrating initial system architecture for a next generation of network (5G).

FIG. 16 is a flowchart illustrating a method for controlling services of a UE in a light connection, in accordance with a sixth embodiment of the present disclosure. As shown in FIG. 16, the method includes the following blocks.

In block 1601, a first RAN node configures a UE to enter a light connection.

In block 1602, a first CN node receives control plane signaling related to the UE from a second CN node, such as a bearer setup request. Similar signaling may be at least one of: a bearer modify request, a bearer release request, a data session setup request, a session modify request, a session release request, a data flow context setup request, a data flow context modify request, a data flow context release request and so on.

In block 1603, the first CN node transmits the bearer setup request/session setup request to the first RAN node.

In block 1604, when the UE is in the light connection, the first RAN node initiates a paging for the UE.

In block 1605, the first RAN node may also transmit a paging request to a second RAN node, and request to page the UE under the control of the second RAN node.

In block 1606, the UE responds to the received paging. The UE may initiate a connection setup request, or a connection resume request to the second RAN node.

In block 1607, the second RAN node initiates a UE context retrieve request to the first RAN node.

In block 1608, after receiving the UE context retrieve request from the second RAN node, the first RAN node learns that the UE has accessed the second RAN node. The first RAN node transmits a bearer setup reject/session setup reject to the first CN node. Optional, relevant reasons for rejection are described in block 302. The reasons for rejection may include at least one of: the UE is switching to another RAN node; the UE is in the light connection; requesting to re-transmit control plane signaling related to the UE to the second RAN node; or requesting not to reject the received control plane signaling.

In block 1609, the first RAN node returns a UE context response to the second RAN node.

In block 1610, the second RAN node transmits a connection setup, or a connection resume to the UE.

In block 1611, the UE transmits a connection setup complete, or a connection resume complete to the second RAN node.

In block 1612, the second RAN node transmits a path switch to the first RAN node.

In block 1613, after performing the path switch, the first CN node learns that the UE has already successfully accessed the second RAN node. The first CN node retransmits the control plane signaling related to the UE to the second RAN node, such as, the bearer setup request/session setup request.

In block 1614, the second RAN node may trigger the UE to initiate a connection reconfigure process, so as to set up a new UE bearer.

In block 1615, the second RAN node returns a bearer setup response/session setup response to the first CN node.

In block 1616, the first CN node returns a bearer setup response/session setup response to the second CN node.

Until now, the embodiment is terminated.

Figure 12:
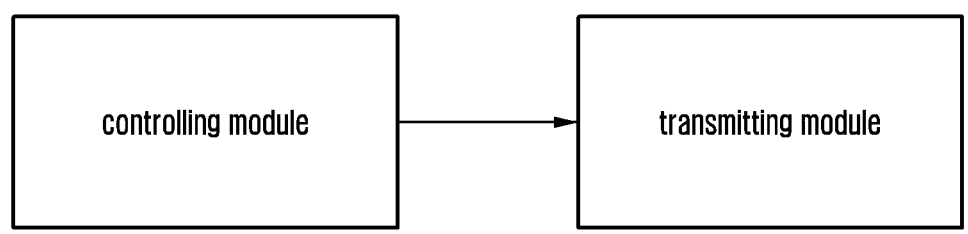
FIG. 12 is a schematic diagram illustrating a structure of a preferred network device, in accordance with an embodiment of the present disclosure.

FIG. 12 is a schematic diagram illustrating a structure of a preferred network device, in accordance with an embodiment of the present disclosure. With reference to FIG. 12, an RAN device includes a transmitting module and a controlling module.

The controlling module is configured to determine whether a predetermined condition is met. When determining that the predetermined condition is met, the controlling module is further configured to control the transmitting module to transmit information about light connection state of a UE, and/or, indication information about light connection of the UE.

The transmitting module is configured to transmit the foregoing information under the control of the controlling module.

Figure 13:
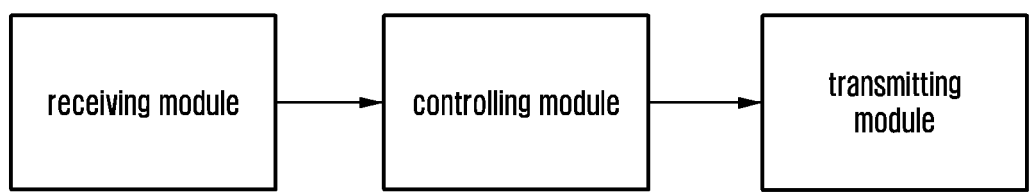
FIG. 13 is a schematic diagram illustrating a structure of a preferred network device, in accordance with an embodiment of the present disclosure.

FIG. 13 is a schematic diagram illustrating a structure of a preferred network device, in accordance with an embodiment of the present disclosure. With reference to FIG. 13, a CN device includes a receiving module, a transmitting module and a controlling module.

The receiving module is configured to receive information from a network device, in which the information refers to information about light connection state of a UE, and/or, indication information about light connection of the UE.

The controlling module is configured to control the transmitting module to perform an associated operation, based on the foregoing information.

Figure 14:
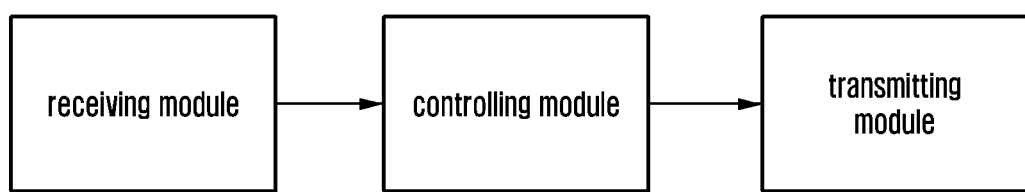
FIG. 14 is a schematic diagram illustrating a structure of a preferred network device, in accordance with an embodiment of the present disclosure.

FIG. 14 is a schematic diagram illustrating a structure of a preferred network device, in accordance with an embodiment of the present disclosure. With reference to FIG. 14, the network device includes a receiving module, a transmitting module and a controlling module.

The receiving module is configured to receive information for offloading a UE, and/or, paging response demand information.

The controlling module is configured to control to offload, and/or, page the UE, based on foregoing information, and control the transmitting module to perform an associated operation.

Figure 15:
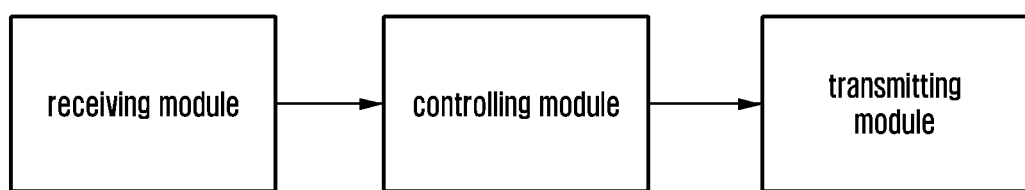
FIG. 15 is a schematic diagram illustrating a structure of a preferred network device, in accordance with an embodiment of the present disclosure.

FIG. 15 is a schematic diagram illustrating a structure of a preferred network device, in accordance with an embodiment of the present disclosure. With reference to FIG. 15, a UE includes a receiving module, a transmitting module and a controlling module.

The receiving module is configured to receive paging response demand information, and/or, information for offloading the UE, from a network device.

The controlling module is configured to control whether to transmit a paging response, based on foregoing information, and control the transmitting module to perform an associated operation.

Objectives, technical solutions and advantages of the present disclosure have been described in detail, accompanying with foregoing preferred embodiments. It should be understood that, foregoing contents are only preferred embodiments of the present disclosure, which are not for use in limiting the present disclosure. Any modifications, equivalent substitutions and improvements made within the spirit and principle of the present disclosure should be covered by protection scope of the present disclosure.

The present invention will be described in further detail hereinafter with reference to accompanying drawings and embodiments to make the objective, technical solution and merits therein clearer.

In order to satisfy communication requirements of UEs with small data amount and low cost (e.g., an IOT device, a Coverage Enhancement (CE) device, a Low Cost (LC) device and a Machine Type Communication (MTC) device), a communication service, Cellular Internet of Thing (CIOT), is introduced. The CIOT is a data transmission optimization method. Data of the CIOT may be carried on a control plane (e.g., a NAS PDU) for transmission, or may be carried on a user plane (e.g., a UE bearer) for transmission.

The CIOT that the data is carried on the control plane is referred to as control plane CIOT optimization. The control plane CIOT optimization does not need to establish a UE bearer in a radio access network node, does not need to establish a radio security context in the radio access network, and security is performed in a core network. By the control plane CIOT optimization, signaling overhead for UE bearer establishment can be omitted, so as to reduce time delay that the UE accesses a network or time delay that the UE transmits and receives data.

The CIOT that the data is carried on the user plane is referred to as user plane CIOT optimization. By the user plane CIOT optimization, when the UE is inactive, the UE context is suspended, but is not deleted. When there are data transmission requirements, the UE context is recovered, rather than to be newly established, so as to reduce signaling overhead for the connection establishment of the UE and signaling overhead for the bearer establishment of the UE, and to reduce time delay that the UE accesses the network or the UE transmits and receives data.

The CIOT communication service may be used for wide band radio access network (e.g., WB EUTRAN, LTE), or may be used for narrow band radio access network (e.g., NB IOT). The core network node or the radio access network node may simultaneously support the CIOT and non-CIOT, or may only support the CIOT. The core network node supporting the CIOT or the radio access network node supporting the CIOT may simultaneously support the control plane CIOT optimization (abbreviated as control plane CIOT) and the user plane CIOT optimization (abbreviated as user plane CIOT), or may only support the control plane CIOT, or may only support the user plane CIOT. It is an important technical feature in 5th generation mobility communication to support a service with a low time delay requirement. Thus, the CIOT as a data transmission optimizing method may apply to a further mobile communication network, which is not limited to IOT devices, and is also not limited to an existing radio network technology.

The following problems still exist in the existing technology:

Problem 1: the existing NB IOT network does not support handover, when the UE moves, data transmission has to be interrupted. However, mobile IOT UEs are an important part of IOT UEs, e.g., a wearable device, a smart bracelet, a traffic recorder, etc. In order to improve mobility and service continuity, the NB IOT network and the IOT UE are requested to support handover.

However, the following problems still exist for the control plane CIOT UE:

in an existing handover procedure, control plane data forwarding is not supported.

in the existing handover procedure, it is requested to transmit UE Evolved Radio Access Bearer (ERAB) context, but a control plane CIOT service only has a control plane bearer, does not have a UE user plane bearer.

in the existing handover procedure, it is requested to transmit information related with UE security information (e.g., a new key), but the control plane CIOT service does not have security context in the radio access network, and encryption is not requested.

since the UE is requested to measure signal quality of a cell around in handover, it causes certain energy waste.

Problem 2: the core network supports retransmission of control plane signaling. Generally speaking, only retransmission for the control signaling not responded is needed, e.g., the MME receives an ATTACH COMMPLETE after transmitting an ATTACH ACCEPT, thus, the ATTACH COMMPLETE is acknowledgement of the ATTACH ACCEPT. However, for the control plane CIOT, only the data is transmitted through the control plane, and there is no substantial ACK information. At present, the radio access network doesn't notify to the control plane of the core network whether the data transmission is successful or unsuccessfully.

Thus, a retransmission mechanism of the core network cannot ensure the data transmission continuity.

Problem 3: the control plane signaling of the core network (e.g., NAS signaling) and the control plane CIOP data (data over NAS) are not distinguished in the radio access network side. The control plane signaling of the core network may be not forwarded because of the retransmission mechanism of the core network, however, the control plane CIOP data needs to be forwarded, which are not clearly distinguished.

Embodiments of the present disclosure are described as follows in detail, examples of the embodiments are illustrated in the accompanying drawings, wherein like reference numerals indicate identical or functionally similar elements throughout. The embodiments of the present disclosure described as follows in conjunction with the accompanying drawings are exemplary, are only used for explaining the present disclosure, however, are not explained as limitation for the present disclosure.

Those skilled in the art can understand that, expect there is additional definition, all items used herein (including technical items and scientific items) have the same meaning as the general understanding of a common technical personal in the field of the present disclosure. It should be understood that those terms, such as defined in a general dictionary, should be understood as the meaning consistent with the meaning in context of the existing technology, and unless it is specifically defined like this, otherwise is not explained through ideal or too formal meaning.

In order to make it easier to understand of technical solutions of the present disclosure, it is necessary to perform description as follows for principles and corresponding items of the present disclosure firstly.

These items in the present disclosure are described as follows.

In some embodiments, the radio access network node may be a base station, an eNB, a NodeB, a central control unit of a radio access network, a distribution unit of the radio access network, etc. In a next generation of network, a concept of the node may be virtualized as a function or a unit. The central control unit of the radio access network may be connected with multiple distribution units of the radio access network node.

In some embodiments, the core network node may be a MME, a SGSN, a SGW and a control node of the core network, a user plane node of the core network, a control plane function of the core network, a user plane function of the core network, a control plane unit of the core network, a user plane unit of the core network, etc. In a next generation network, a concept of the node may be virtualized as a function of a unit.

In some embodiments, the control node of the core network may be the MME, the SGSN, a control plane function of the core network, a control plane unit of the core network, etc.

In some embodiments, the user plane unit of the core network may be the SGW, the SGSN, a user plane function of the core network, a user plane unit of the core network, a network slice, etc.

In some embodiments, a CIOT bearer may be a user plane CIOT bearer or a bearer supporting user plane CIOT optimization. A non-CIOT bearer may be a CIOT bearer not in the user plane, a common bearer, etc.

In some embodiments, the control plane may be a signaling plane, NAS signaling, signaling radio bearer (SRB).

In some embodiments, CIOT may be referred as to Internet of Thing (IOT), Narrow Band Internet of Thing (NB IOT).

In some embodiments, the CIOT mentioned below in the present disclosure may be expressed as IOT or NB IOT.

It should be noted that, the present disclosure provides a data continuity controlling method for a user equipment, i.e., the method is firstly described from perspective of a first radio access network node, through programming, the data continuity controlling method for the UE may be implemented as computer program on a remote radio access network device, which includes, but is not limited to, a computer, a network host computer, a single network server, a cloud including multiple network server sets or multiple servers.

Figure 19:
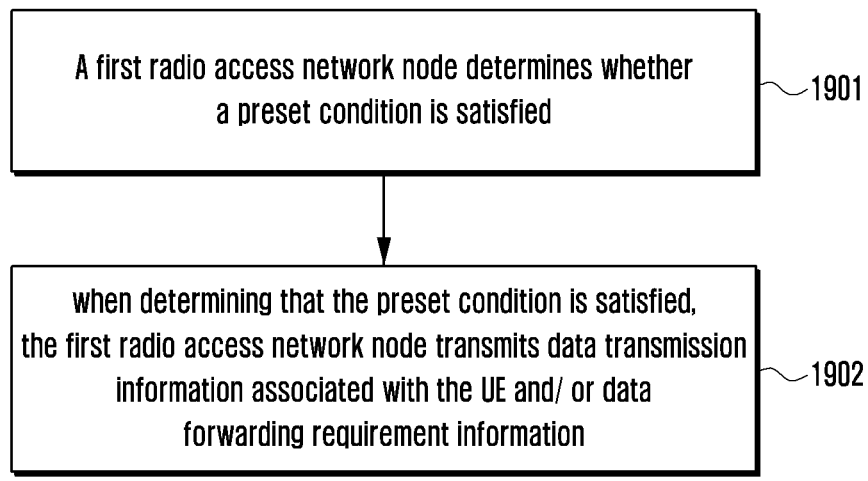
FIG. 19 is a flowchart illustrating a first data continuity controlling method for a UE according to the present disclosure.

FIG. 19 is a flowchart illustrating a first data continuity controlling method for a UE according to the present disclosure. The method includes procedures as follows.

At block 1901, the first radio access network node determines whether a preset condition is satisfied.

Optionally, the preset condition may include at least one of the following:

1) it is after transmitting the received data packet of the UE. For example, transmitting the data packet of the UE received from the core to the UE, or transmitting the data packet of the UE received from the UE to the core network. In some embodiments, when receiving the data packet of the UE, the first radio access network node may receive an index of the data packet of the UE in the meantime.

2) completing each transmission of each data packet. In some embodiments, once transmission of a data packet is completed, data transmission information associated with the UE is transmitted.

3) the UE leaves the network, which may include at least one of the following: the UE becomes unreachable with a network, a radio link connection between the UE and the first radio access network node fails, the UE moves out of a coverage range of a current cell or the UE enters a blind area, the first radio access network node becomes unreachable with the UE. In some embodiments, after finding out that the UE leaves and there is a data packet not transmitted locally, the first radio access network node transmits the data transmission information associated with the UE. The core network may buffer the part of data, and retransmits the part of the data to the UE when the UE re-accesses to the network.
4) a connection between the UE and the network is resumed. For example, the UE performs access through a second radio access network, and a second radio access network node notifies the first radio access network node (e.g., a radio link failure notification).
5) it is when the UE needs to leave the first radio access network, e.g., when handing over the UE to another radio access network node, when releasing the UE, suspending the UE.
a) the UE needs to be handed over, e.g., a handover event occurs. In some embodiments, in a handover request, the first radio access network node notifies to a core network node an index of a last data packet which is transmitted and acknowledged by the UE, the core network node may continue to transmit another data packet to a target radio access network node when the handover is performed or after the UE accesses the target radio access network node. In another embodiment, the first radio access network node forwards to the core network node data packets not transmitted, data packets transmitted but not acknowledged, or data packets unsuccessfully transmitted, the core network node may transmit the received data packet to the target radio access network node.
b) the UE needs to be released or suspended, e.g., the handover is not supported or the UE becomes unreachable. In an embodiment, when the connection associated with the UE between the radio access network and the core network node is released, the first radio access network node notifies to the core network node the index of the last data packet of the UE transmitted and acknowledged by the UE, thus, the core network node may continue to transmit another data packet to the target radio access network node when the handover is performed or after the UE accesses the target access network node. In another embodiment, the first access network node forwards to the core network the data packet not transmitted, the data packet transmitted but not acknowledged or the data packet unsuccessfully transmitted, and the core network node may buffer the received data packet in the core network, and transmits the data packet to the radio access network node accessed by the UE after the UE re-accesses the radio access network.
6) there is a data packet of the UE not transmitted. The data packet of the UE not transmitted may be transmitted to the UE when the UE resumes access. In some embodiments, the data packet of the UE not transmitted includes the data packet of the UE transmitted but not acknowledged by the UE.
7) there is a data packet of the UE transmitted but not acknowledged by the UE. The data packet of the UE transmitted but not acknowledged by the UE may be retransmitted to the UE when the UE resumes the access.
8) there is a data packet of the UE unsuccessfully transmitted.
9) the first radio access network node is a NB IOT network. In some embodiments, only the NB IOT network needs to improve the data transmission continuity.
10) the data of the UE is transmitted through a CIOT way. In some embodiments, only a control plane CIOT network needs to improve the data transmission continuity.
11) the data of the UE is transmitted through a control plane CIOT way. In some embodiments, only the control plane CIOT network needs to improve the data transmission continuity.
12) data forwarding address information is received, e.g., a data forwarding address of a downlink packet.

In some embodiments, the first radio access network node receives information that the UE performs the CIOT in advance. Preferably, the first radio access network node may receive an index of the data packet of the UE and the information that the UE performs the CIOT from a second radio access network node, a core network node or the UE. Optionally, the information that the UE performs the CIOT may include, but is not limited to, at least one of the following: control plane CIOT, user plane CIOT.

At block 1902: when determining that the preset condition is satisfied, the first radio access network node transmits data transmission information associated with the UE and/or data forwarding requirement information.

Preferably, when it is determined that the preset condition is satisfied and the data of the UE is transmitted through the CIOT way, the first radio access network node transmits the data transmission information associated with the UE and/or the data forwarding requirement information.

In some embodiments, when the satisfied preset condition includes that the UE leaves the first radio access network node and there is the data packet of the UE not transmitted, the data transmission information associated with the UE transmitted by the first radio access network includes the index of the data packet not transmitted and/or the data packet not transmitted.

In some embodiments, the satisfied preset condition includes that the UE needs to leave the first radio access network node and there is the data packet of the UE not transmitted, the data transmission information associated with the UE transmitted by the first radio access network includes the index of the data packet not transmitted and/or the data packet not transmitted.

In some embodiments, the satisfied preset condition includes that the data forwarding address information is received, and the data transmission information associated with the UE transmitted by the first radio access network includes the index of the data packet not transmitted and/or the data packet not transmitted.

In some embodiments, the satisfied preset condition includes that the first radio access network node is a NB IOT supporting an IOT device, the data of the UE is transmitted through a CIOT way, and the data forwarding address information is received, and the data transmission information associated with the UE transmitted by the first radio access network includes the index of the data packet not transmitted and/or the data packet not transmitted.

Preferably, the first radio access network node may transmit the data transmission information associated with the UE to the second radio access network node, the core network node or the UE. Optionally, the data transmission information associated with the UE may include at least one of the following: a transmission type indication, an index of a data packet, the data packet.

1) optionally, the transmission type indication may include at least one of the following: a transmission successful indication, a transmission unsuccessful indication, an indication that transmission is not performed, an indication that the transmission is performed, but is not acknowledged.

2) optionally, the index of the data packet may include at least one of the following: an index of a data packet successfully transmitted, an index of a data packet unsuccessfully transmitted, an index of a data packet not transmitted, an index of a data packet transmitted but not acknowledged.

3) optionally, the data packet may include at least one of the following: a forwarded downlink data packet, a uplink data packet. The forwarded downlink data packet may include at least one of the following: a data packet successfully transmitted, a data packet unsuccessfully transmitted, a data packet not transmitted, a data packet transmitted but not acknowledged.

Preferably, when there is no uplink data, the transmission type indication associated with the downlink data may be carried in an uplink empty packet, e.g., when confirming the UE successfully receives a control plane data packet, the first radio access network node may transmit an empty control plane data packet (e.g., a NAS PDU) as response, and confirms that the data packet is successfully received.

Preferably, the successful transmission can be that the data packet is transmitted and is acknowledged by the reception party. The data packet successfully transmitted may be a data packet which is successfully transmitted and for which t acknowledgement from the reception party is received. Preferably, the data packet not transmitted may include a data packet transmitted but not acknowledged by the reception party.

In some embodiments, once a data packet is transmitted, the first radio access network transmits the data transmission information associated with the UE, which may indicate whether the data packet is transmitted successfully or unsuccessfully. In another embodiment, when the UE needs to leave the first radio access network, e.g., the UE needs to be handed over or the UE needs to be released, the first radio access network node transmits the data transmission information associated with the UE, which indicates which data packets are successfully transmitted. In another embodiment, when transmission fails, the first radio access network node transmits the data transmission information associated with the UE, which indicates the data packet unsuccessfully transmitted; if there is no indication, it is implicit indicates that at least one of the following occurs: transmission successes, transmission is not acknowledged, or is not performed. In another embodiment, only when the transmission successes, the first radio access network node transmits the data transmission information associated with the UE, which for example indicates an index of the packet successfully transmitted; if there is no indication, it implicitly indicates that at least one of the following occurs: transmission fails, transmission is not acknowledged, or transmission is not performed yet.

Optionally, the index of the data packet successfully transmitted may include at least one of the following:

1) the index of each data packet successfully transmitted;

2) a last index in a group of data packets successfully transmitted, e.g., packets 1-3 are successfully transmitted, only 3 is taken as the successful index.

3) a first index and a last index in a group of data packets successfully transmitted, e.g., packets 1-3 are successfully transmitted, 1 and 3 are transmitted.

Optionally, the data packet unsuccessfully transmitted may include at least one of the following:

1) the index of each data packet unsuccessfully transmitted;

2) a last index in a group of data packets unsuccessfully transmitted, e.g., packets 1-3 are successfully transmitted, only 3 is taken as the unsuccessful index.

3) a first index and a last index in a group of data packets unsuccessfully transmitted, e.g., packets 1-3 are successfully transmitted, 1 and 3 are transmitted.

Optionally, the data packet not transmitted may include at least one of the following:

1) the index of each data packet not transmitted;

2) a last index in a group of data packets not transmitted, e.g., packets 1-3 are successfully transmitted, only 3 is taken as the index not transmitted.

3) a first index and a last index in a group of data packets not transmitted, e.g., packets 1-3 are successfully transmitted, 1 and 3 are transmitted.

The data of the UE may be further divided into control plane data of the UE or user plane data of the UE; uplink data of the UE or downlink data of the UE; or permutations and combinations of the two above, e.g., control plane downlink data of the UE.

In some embodiments, when receiving the data packet of the UE, the first radio access network node simultaneously receives at least one of the following: an index of the data packet of the UE.

Optionally, the data forwarding requirement information includes at least one of the following: a data forwarding requirement indication, a control plane data forwarding requirement indication, a user plane data forwarding requirement indication. In some embodiments, when the UE needs to leave the first radio access network, e.g., the UE needs to be handed over or the UE needs to be released, and there is only data packet not transmitted, the data forwarding requirement information is transmitted.

Figure 20:
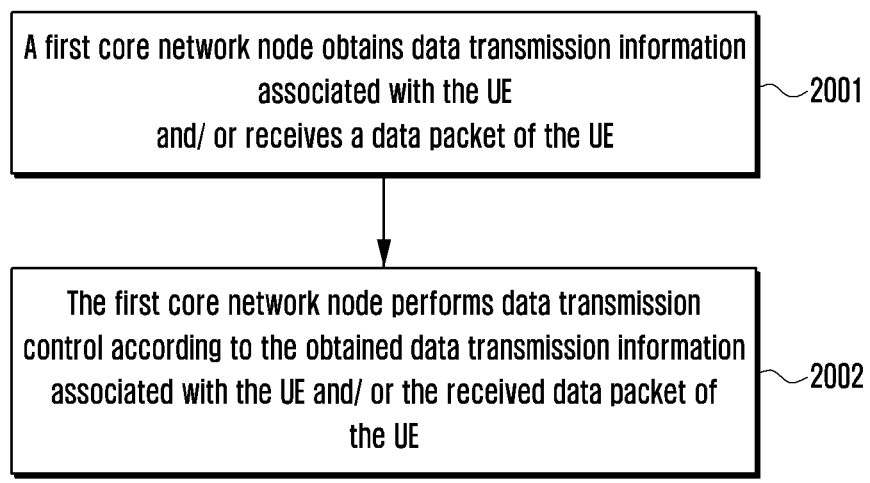
FIG. 20 is a flowchart illustrating a second data continuity controlling method for a UE according to the present disclosure.

FIG. 20 is a flowchart illustrating a second data continuity controlling method for a UE according to the present disclosure. The method includes procedures as follows.

At block 2001: the first core network node obtains data transmission information associated with the UE and/or receives a data packet of the UE.

Preferably, the first core network may obtain the data transmission information associated with the UE from a first radio access network node, a second core network node or the UE, or may receive the data packet of the UE from a first radio access network node, a second core network node or the UE.

Optionally, the data transmission information associated with the UE is same as that described in block 1902, which is not repeatedly described herein.

Optionally, the received data packet of the UE may include at least one of the following: a data packet of the UE previously transmitted from the first core network to the first radio access network, a data packet of the UE previously transmitted from the user plane node of the core network to the first radio access network, a data packet transmitted from the UE to the first radio access network, a data packet of the UE not transmitted by the first radio access network node. Preferably, the data packet of the UE not transmitted may include the data packet of the UE transmitted but not acknowledged by the reception party.

In some embodiments, the first core network node may receive the data packet of the UE through at least one of the following ways: the first core network node may receive data packets of the UE one by one from signaling messages transmitted by the radio access network node, or the first core network node may receive the data packets of the UE from the allocated data forwarding address.

Preferably, the received data packet of the UE may be control plane data of the UE or user plane data of the UE; uplink data of the UE or downlink data of the UE; or permutations and combinations of the two above, e.g., control plane downlink data of the UE.

Preferably, the data packet of the UE may be further divided into a control plane data packet of the UE or a user plane data packet of the UE; an uplink data packet of the UE or a downlink data packet of the UE; or permutations and combinations of the two above, e.g., a control plane downlink data packet of the UE.

At block 2002, the first core network node performs data transmission control according to the obtained data transmission information associated with the UE and/or the received data packet of the UE.

Preferably, when determining that the data of the UE is transmitted through the CIOT way, the first core network performs the data transmission control according to the obtained data transmission information associated with the UE or the received data packet of the UE.

Preferably, the data transmission control may include at least one of the following:
1) determining which data packets of the UE are successfully transmitted. The data packets of the UE successfully transmitted may be deleted.
2) determining which data packets of the UE are transmitted, but are not acknowledged. The data packets of the UE transmitted but not acknowledged may be retransmitted.
3) determining which data packets of the UE are unsuccessfully transmitted. The data packets of the UE unsuccessfully transmitted may be retransmitted, or may be deleted.
4) determining which data packets of the UE are not transmitted, and the data packets of the UE not transmitted may be retransmitted. In some embodiments, e.g., when a handover event occurs or the UE becomes unreachable, for the data packets of the UE previously transmitted from the first core network node to the first radio access network but have not been transmitted to the UE yet, when the UE accesses the network again, the first core network may retransmit these data packets of the UE to the UE via radio network.
5) determining whether a buffered data packet of the UE is deleted. The data packet of the UE for which successful transmission is acknowledged may be deleted.
6) determining whether to buffer the received data packet of the UE.
7) determining whether to forward the received data packet of the UE which is forwarded.
8) determining whether to retransmit the data packet of the UE
9) determining a next data packet of the UE to be transmitted. For example, it is determined that transmission is started from a first data packet behind a last data packet of the UE confirmed to be successfully transmitted. If an index of the last data packet confirmed to be successfully transmitted is 3, the data packet with an index 4 is taken as a start of continuing transmission.
10) stopping transmitting the data packet of the UE to the first radio access network.
11) determining that the UE leaves the first radio access network node or prepares to leave the first radio access network node.

In an embodiment, in handover, when receiving a handover request from the radio access network node, the core network node receives the data transmission information associated with the UE or the forwarded data packet of the UE, determines data packets which are previously transmitted to the radio access network but are not transmitted to the UE yet or which are previously transmitted to the radio access network and are transmitted to the UE but not acknowledged, these data packets of the UE and other data packets of the UE which are not transmitted to the radio networking are transmitted to a target radio access network node.

In another embodiment, when a connection associated with the UE is released or suspended and the core network node receives the data transmission information associated with the UE or the forwarded data packet of the UE, the core network node determines data packets which are previously transmitted to the radio access network are not transmitted, or data packets which are previously transmitted to the radio access network and are transmitted to the UE but not acknowledged. These data packets of the UE continue to be buffered together with other data packets of the UE which are not transmitted to the radio network yet and will be transmitted to the UE when the UE resumes the connection with the network.

Figure 21:
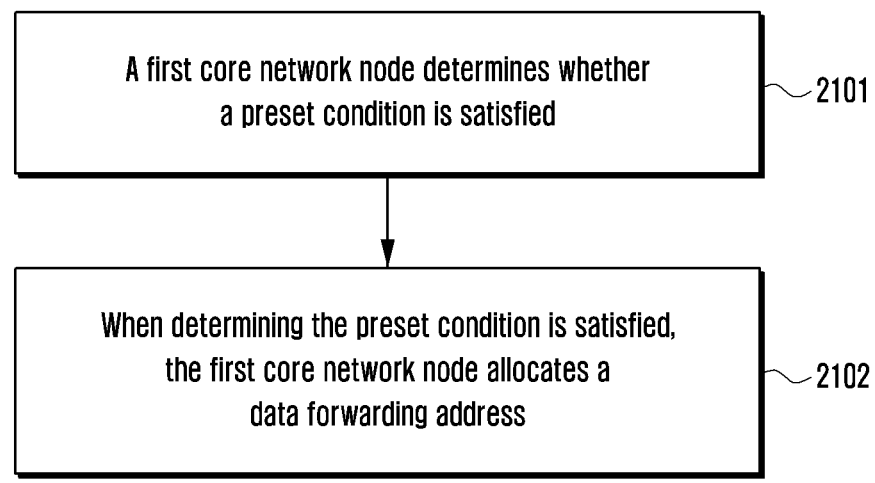
FIG. 21 is a flowchart illustrating a third data continuity controlling method for a UE according to the present disclosure.

FIG. 21 is a flowchart illustrating a third data continuity controlling method for a UE according to the present disclosure. The method includes procedures as follows.

At block 2101: a first core network node determines whether a preset condition is satisfied.

Optionally, the preset condition may include at least one of the following:
1) receiving the data forwarding requirement information associated with the UE. In an embodiment, the first core network node receives the data forwarding requirement information associated with the UE from a first radio access network node. Optionally, the data forwarding requirement associated with the UE is as described in block 1902, which is not repeatedly described herein.
2) finding out that the UE leaves the network, which may include at least one of the following:
a) finding out that the UE becomes unreachable, e.g., periodic location updating for the UE is not received.
b) receiving a notification that a UE becomes unreachable, e.g., the UE moves out of a coverage range of a current cell, or the UE enters a blind area, or a periodic TAU from the UE is not received. The first core network node may receive the notification that the UE becomes unreachable from the radio access network node accessed by the UE.
3) the UE needs to be handed over, e.g., a handover request associated with the UE is received. In an embodiment, in the handover request, the first radio access network node notifies the data forwarding requirement to the core network node.
4) the UE needs to be released, e.g., a UE context release request is received, or a notification that the UE becomes unreachable is received. In an embodiment, when the connection associated with the UE between the radio access network and the core network node is released, the first radio access network node notifies the data forwarding requirement to the core network node.
5) the UE is within the NB IOT network.

6) the data of the UE is transmitted through a CIOT way. In some embodiments, only a control plane CIOT network needs to improve the data transmission continuity.

7) the data of the UE is transmitted through a control plane CIOT way. In some embodiments, only the control plane CIOT network needs to improve the data transmission continuity.

At block 2102: when determining the preset condition is satisfied, the first core network node allocates a data forwarding address.

Preferably, when determining that the preset condition is satisfied and the data of the UE is transmitted through the CIOT way, the first core network node allocates the data forwarding address.

In an embodiment, the UE transmits the data through the control plane CIOT, the first core network node allocates the control plane data forwarding address. The control plane data forwarding address may be a data forwarding address of a control plane node of the core network.

In an embodiment, the satisfied preset condition includes that the UE performs CIOT, the process that the first core network node allocates the control plane data forwarding address information includes at least one of the following:

In an embodiment, the satisfied preset condition includes that it is found out that the UE becomes unreachable, and the data of the UE is transmitted through the CIOT way, the first core network node allocates the control plane data forwarding address information;

in an embodiment, the satisfied preset condition includes that the UE needing to be handed over becomes unreachable, and the data of the UE is transmitted through the CIOT way, the first core network node allocates the control plane data forwarding address information;

and/or, in an embodiment, the satisfied preset condition includes that a UE connection needs to be released, and the data of the UE is transmitted through the CIOT way, the first core network node allocates the control plane data forwarding address information.

Preferably, the data forwarding address information may include at least one of the following: a data forwarding address, a control plane data forwarding address, a user plane data forwarding address.

The core network node may transmit the data forwarding address to at least one of the following: the UE, a radio access network node, a second core network node.

The first core network node may receive the forwarded data of the UE at the allocated data forwarding address.

Figure 22:
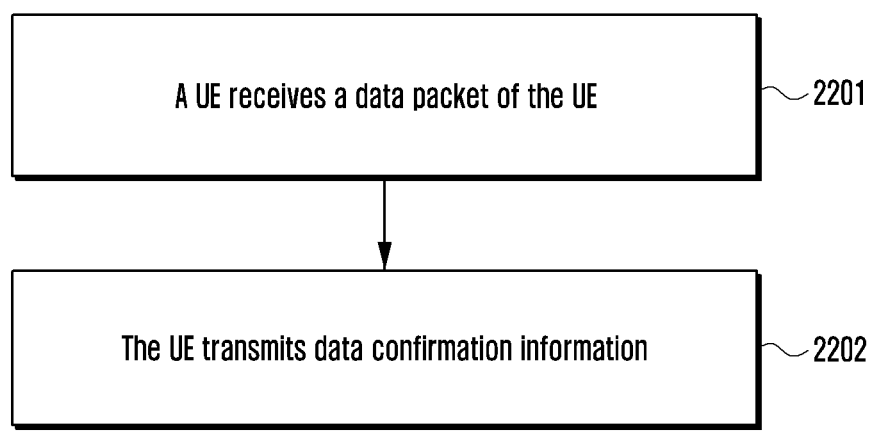
FIG. 22 is a flowchart illustrating a fourth data continuity controlling method for a UE according to the present disclosure.

FIG. 22 is a flowchart illustrating a fourth data transmission continuity controlling method according to the present disclosure. The method includes procedures as follows.

At block 2201, a UE receives a data packet of the UE.

Preferably, the data packet of the UE may be control plane data of the UE or user plane data of the UE.

At block 2202, the UE transmits data confirmation information.

Preferably, when the data packet of the UE received by the UE is transmitted through the control plane CIOT, the UE transmits the data confirmation information.

Preferably, data packet confirmation information may include at least one of the following: a confirmation type indication, an index of a data packet, and the data packet. The confirmation type indication may include at least one of the following: transmission success, reception success, transmission failure, reception failure.

The index of the data packet may be an index of downlink data received by the UE.

Preferably, when the UE just has uplink data, the UE may transmit the data packet confirmation information together with the uplink data packet. When the UE does not have the uplink data, the UE may add the data packet confirmation information into an empty packet, e.g., when the UE successfully receives a control plane data packet (e.g., a NAS PDU), the UE may transmit an empty control plane data packet as response, and confirms that the data packet has been successfully received.

Preferably, the UE transmits the data packet confirmation information to the radio access network node, the core network node or the UE.

Embodiment 1

Figure 23:
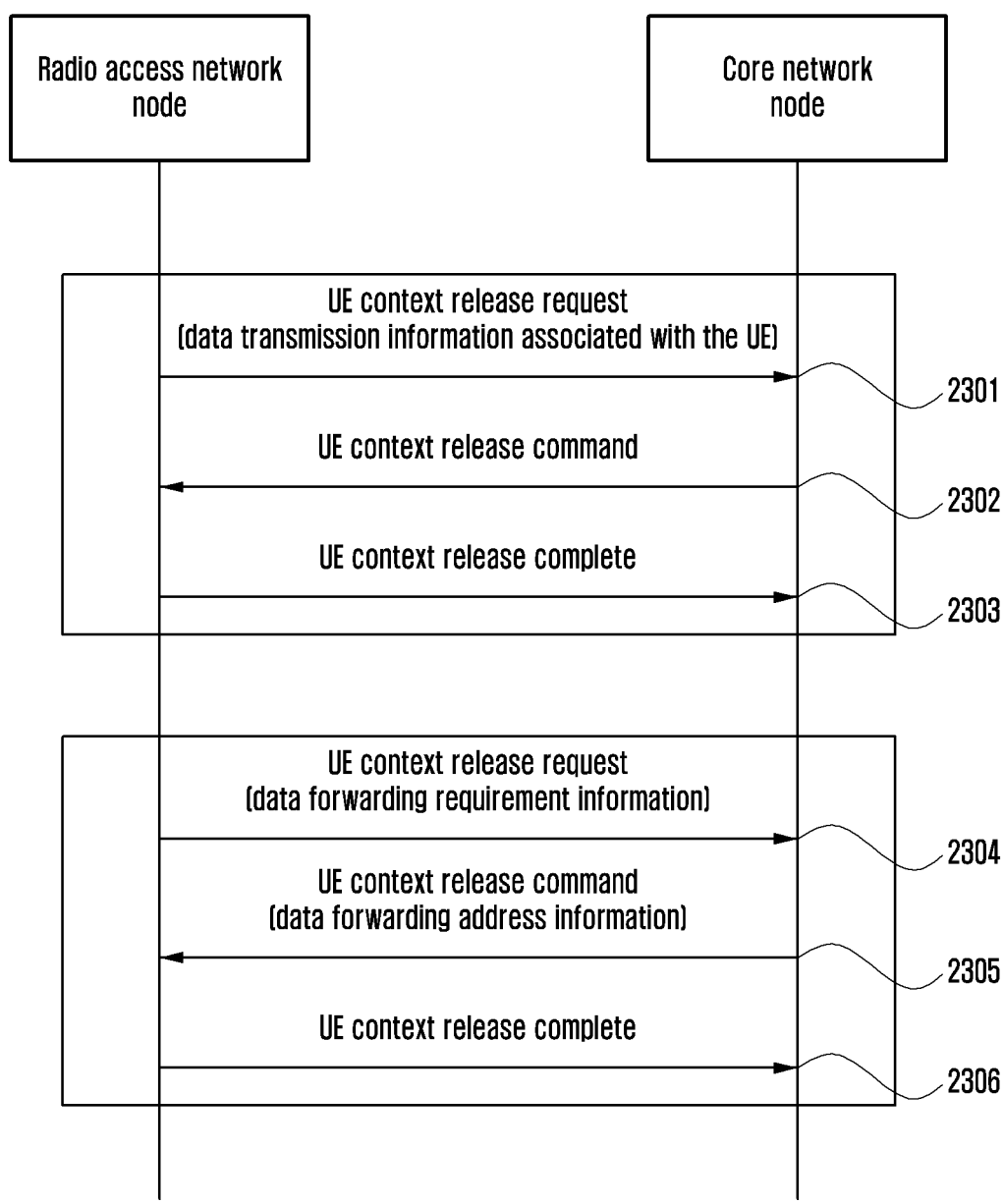
FIG. 23 is a schematic diagram illustrating a data continuity controlling method for a UE according to embodiment 1 of the present disclosure.

FIG. 23 is a schematic diagram illustrating a data transmission continuity controlling method for a user equipment according to embodiment 1 of the present disclosure. When finding out that a UE becomes unreachable, a radio access network node may transmit information of data packets not transmitted to a core network node, so that the core network node retransmits these packets. As shown in FIG. 23, when the radio access network node finds out that the UE becomes unreachable or the UE interrupts a connection, there are two ways to notify a data transmission condition associated with the UE to the core network node, which are respectively blocks 2301-2303 and blocks 2304-2306. The method includes procedures as follows.

At block 2301, the radio access network node transmits a UE context release message to the core network node. Optionally, the message includes the data transmission information associated with the UE. The data transmission information associated with the UE is as described in block 1902, which is not repeatedly described herein. The core network node knows which data is not transmitted, or which data is transmitted, but is not acknowledged, the core network node may retransmit the data when the UE re-accesses the network, detail operations are as described in block 2002.

At block 2302, the core network node transmits a UE context release command to the UE.

At block 2303, the radio access network node transmits a UE context release response to the UE.

At block 2304, the radio access network node transmits a UE context release message to the core network node. Optionally, the message includes data forwarding requirement information. The data forwarding requirement information is as described in block 1902, which is not described herein. Through the data forwarding requirement information, the core network node may allocate a data forwarding address to the radio access network, and the data is forwarded back to the core network node. The core network node may retransmit the data when the UE re-access the network, which is as described in block 2102.

At block 2305, the core network node transmits a UE context release command message to the UE. Optionally, the message includes the data forwarding address associated with the UE.

At block 2306, the radio access network node transmits a UE context release response to the UE.

So far, the method process in the embodiment ends.

Embodiment 2

Figure 24:
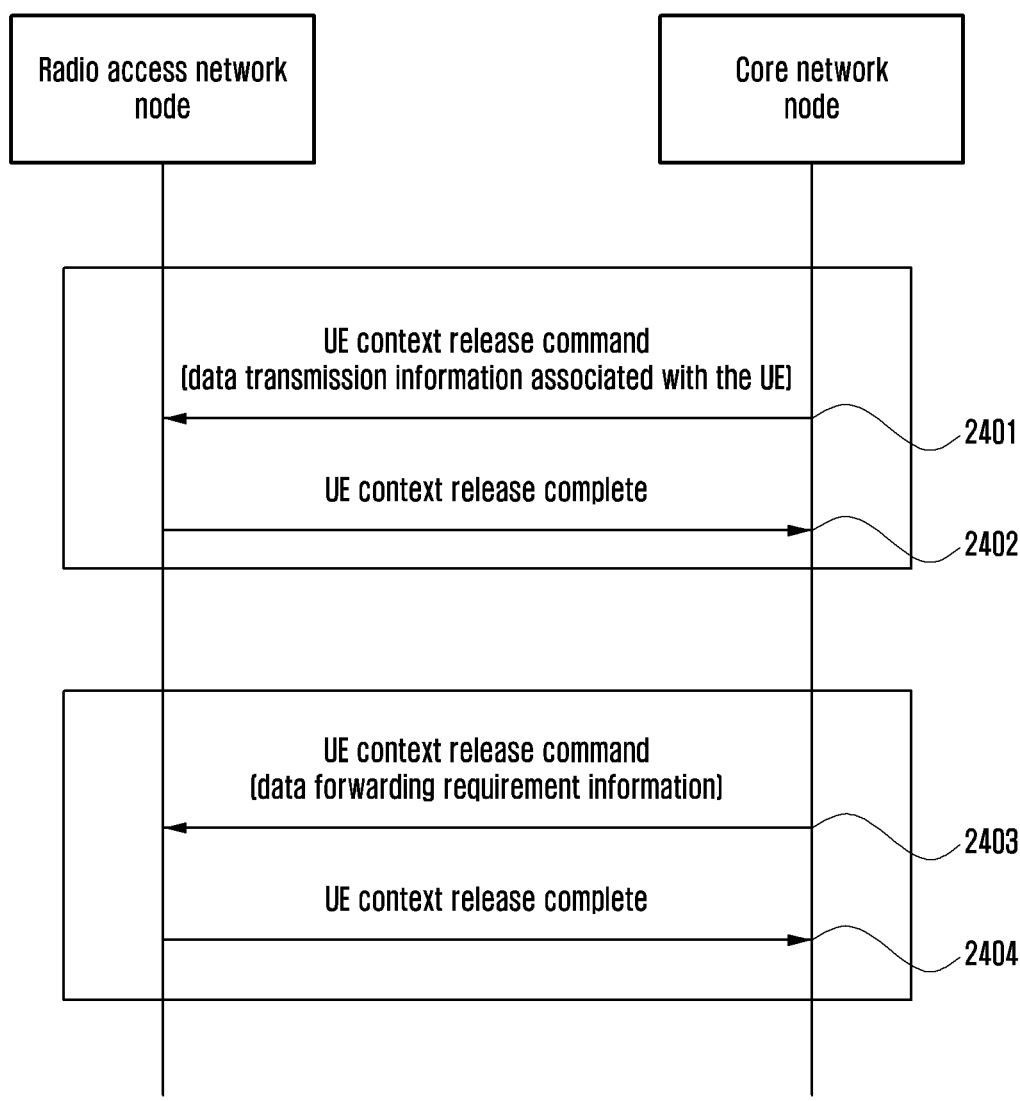
FIG. 24 is a schematic diagram illustrating a data continuity controlling method for a UE according to embodiment 2 of the present disclosure.

FIG. 24 is a schematic diagram illustrating a data transmission continuity controlling method for a user equipment according to embodiment 2 of the present disclosure. When finding out that a UE becomes unreachable, a core network node may require a radio access network node to release a UE connection. At this time, the radio access network node may transmit information of data packets not transmitted to the core network node, so that the core network node retransmits these packets. As shown in FIG. 24, when the radio access network node receives a connection release transmitted from the core network node, there are two ways to notify a data transmission condition associated with the UE to the core network node, which are respectively blocks 2401-2402 and blocks 2403-2404. The method includes procedures as follows.

At block 2401, the core network node transmits a UE context release command to the UE.

At block 2402, the radio access network node transmits a UE context release response to the UE. Optionally, the message includes data transmission information associated with the UE. The data transmission information associated with the UE is as described in block 1902, which is not repeatedly described herein. Through the data transmission information associated with the UE, the core network node knows which data is not transmitted, or which data is transmitted but is not acknowledged, the core network node may retransmit the data when the UE re-accesses the network, which is as described in block 2002.

At block 2403, the core network node transmits a UE context release command message to the UE. Optionally, the message includes a data forwarding address associated with the UE. When the radio access network node still has data not transmitted or data transmitted but not acknowledged, the data not transmitted or the data transmitted but not acknowledged is forwarded back to the core network node. The core network node may retransmit the data when the UE re-accesses the network, a detail step is as described in block 2102.

At block 2404, the radio access network node transmits a UE context release response to the UE.

So far, the method process in the embodiment ends.

Embodiment 3

Figure 25:
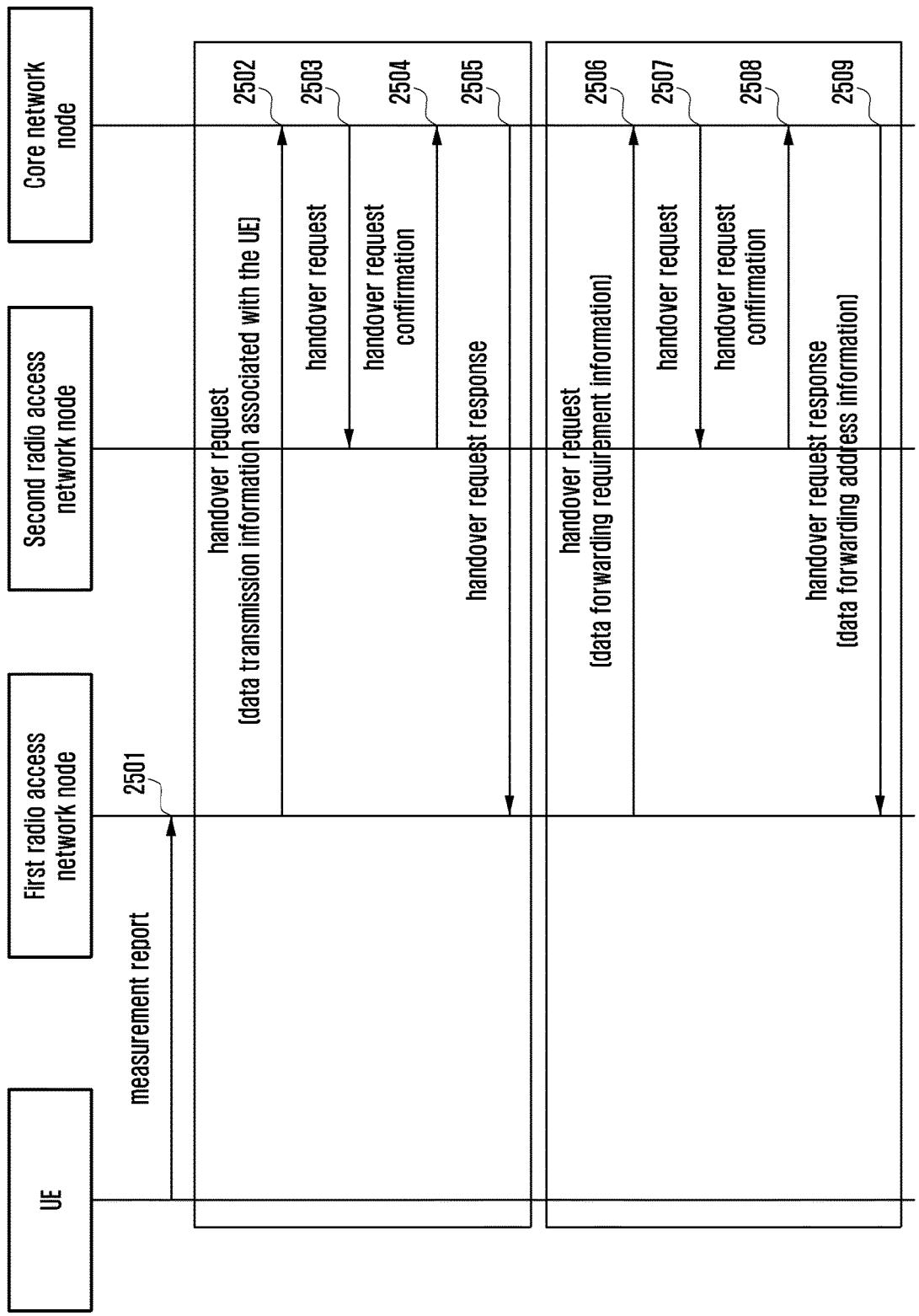
FIG. 25 is a schematic diagram illustrating a data continuity controlling method for a UE according to embodiment 3 of the present disclosure.

FIG. 25 is a schematic diagram illustrating a data transmission continuity controlling method for a user equipment according to embodiment 3 of the present disclosure. When the UE needs to be handed over, the radio access network node may transmit information of data packets not transmitted to a core network node, so that the core network node retransmits these packets. As shown in FIG. 25, the method includes procedures as follows.

At block 2501, the first radio access network node determines to hand over the UE according to a measurement report of the UE, there are two ways to notify a data transmission condition associated with the UE to the core network node, which are respectively blocks 2502-2505 and blocks 2506-2509. The method includes procedures as follows.

At block 2502, the first radio access network node transmits a handover request message to the core network node. Optionally, the message includes data transmission information associated with the UE. The data transmission information associated with the UE is as described in block 1902, which is not repeatedly described herein. Through the data transmission information associated with the UE, the core network node knows which data is not transmitted, or which data is transmitted but is not acknowledged, the core network node may retransmit the data when the UE re-accesses the network, detail operations are as described in block 2002.

At block 2503, the core network node transmits the handover request message to a second radio access network node.

At block 2504, the second radio access network node transmits a handover request confirmation message to the core network node.

At block 2505, the core network node transmits a handover response message to the first radio access network node.

At block 2506, the first radio access network node transmits a handover requirement message to the core network node. Optionally, the message includes data forwarding requirement information. The data forwarding requirement information is as described in block 1902, which is not repeatedly described herein. Through the data forwarding requirement information, the core network mode may allocate a data forwarding address to the radio access network, and the data is forwarded back to the core network node. The core network node may retransmit the data when the UE re-accesses the network, details are as described in block 2102.

At block 2507, the core network node transmits a handover request message to a second radio access network node.

At block 2508, the second radio access network node transmits a handover request confirmation message to the core network node.

At block 2509, the core network node transmits a handover response message to the first radio access network node. Optionally, the message includes a data forwarding address associated with the UE. When the radio access network node still has data not transmitted, or data transmitted but not acknowledged, the radio access network node forwards the data not transmitted or the data transmitted but not acknowledged back to the core network node. The core network node may retransmit the data when the UE re-accesses the network, details step are as described in block 2102.

So far, the method process in the embodiment ends.

Embodiment 4

Figure 26:
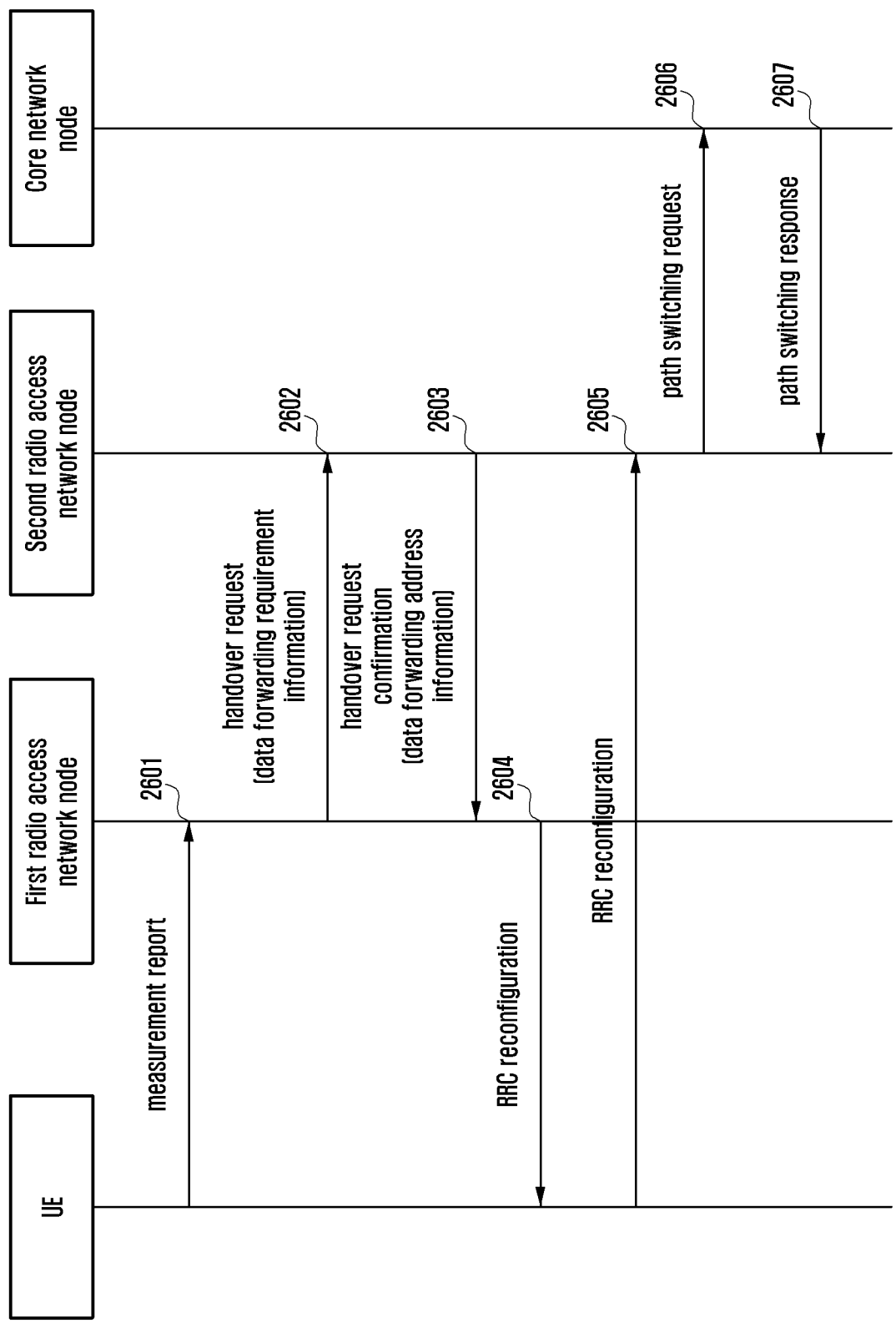
FIG. 26 is a schematic diagram illustrating a data continuity controlling method for a UE according to embodiment 4 of the present disclosure.

FIG. 26 is a schematic diagram illustrating a data transmission continuity controlling method for a user equipment according to embodiment 4 of the present disclosure. When the UE needs to be handed over, the radio access network node may transmit a handover request to a second radio access network node, and may transmit information of data packets not transmitted or data packets transmitted but not acknowledged to the second radio access network node. As shown in FIG. 26, the method includes procedures as follows.

At block 2601, the first radio access network node determines to hand over the UE according to a measurement report of the UE; or the first radio access network node receives a radio link failure notification from the second radio access network, determines to hand over the UE. The radio link failure notification indicates that the UE accesses from the second radio access network node after the radio link between the UE and the first radio access network node fails.

At block 2602, the first radio access network node transmits a handover request message to the second radio access network node. Optionally, the message includes data forwarding requirement information. The data forwarding requirement information is as described in block 1902, which is not repeatedly described herein. Through the data forwarding requirement information, the core network node may allocate a data forwarding address to the radio access network, and the data is forwarded back to the core network node. The core network node may retransmit the data when the UE re-accesses the network, which is as described in block 2102.

Optionally, for control plane data transmission, the first radio access network node may further indicate user plane bearer context and UE security context in the handover request message to the second radio access network node.

At block 2603, the second radio access network node transmits a handover response message to the first radio access network node. Optionally, the message includes a data forwarding address associated with the UE. When the radio access network node still has data not transmitted, or data transmitted but not acknowledged, the radio access network node forwards the data not transmitted or the data transmitted but not acknowledged back to the core network node. The core network node may retransmit the data when the UE re-accesses the network, and details are as described in block 2102.

At block 2604, optionally, the first radio access network node transmits a RRC reconfiguration request to the UE. The message may be omitted in a radio link failure condition.

At block 2605, optionally, the UE transmits a RRC reconfiguration response to the second radio access network node. The message may be omitted in a radio link failure condition.

At block 2606, optionally, the second radio access network node transmits a path switching request to the core network node.

At block 2607, optionally, the core network node transmits a path switching request confirmation to the second radio access network node.

So far, the method process in the embodiment ends, steps not related with the method are omitted.

Embodiment 5

Figure 27:
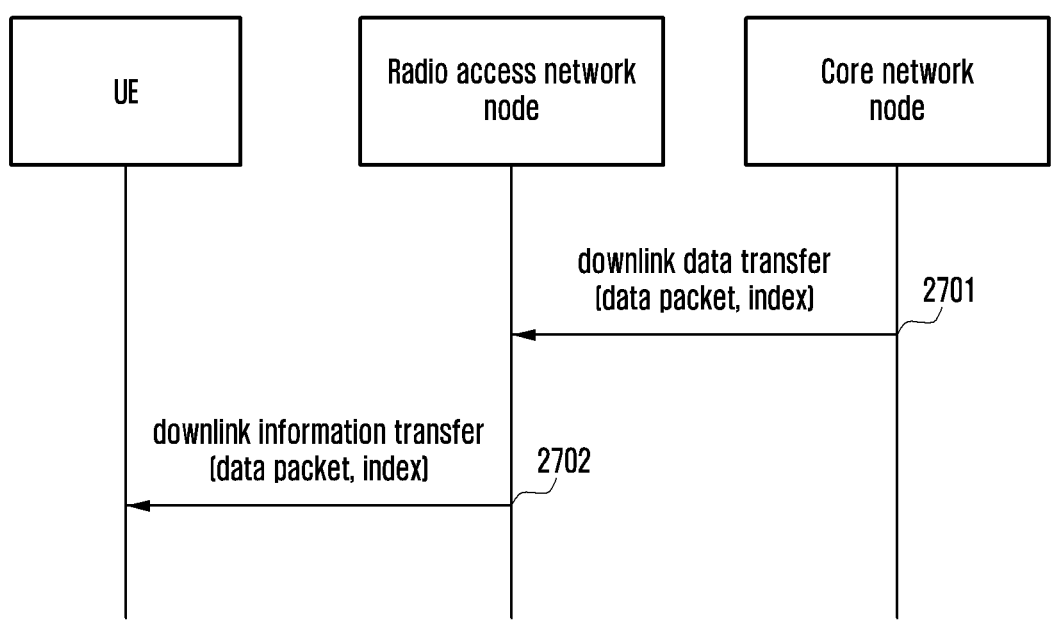
FIG. 27 is a schematic diagram illustrating a data continuity controlling method for a UE according to embodiment 5 of the present disclosure.

FIG. 27 is a schematic diagram illustrating a data transmission continuity controlling method for a user equipment according to embodiment 5 of the present disclosure. As shown in FIG. 27, the method includes procedures as follows.

At block 2701, a core network node transmits a downlink NAS transfer message to a radio access network node. Optionally, the message includes an index of a NAS PDU in the message.

At block 2702, the radio access network node transmits a downlink information transfer message. Optionally, the message includes an index of a NAS PDU in the message.

So far, the method process in the embodiment ends.

Embodiment 6

Figure 28:
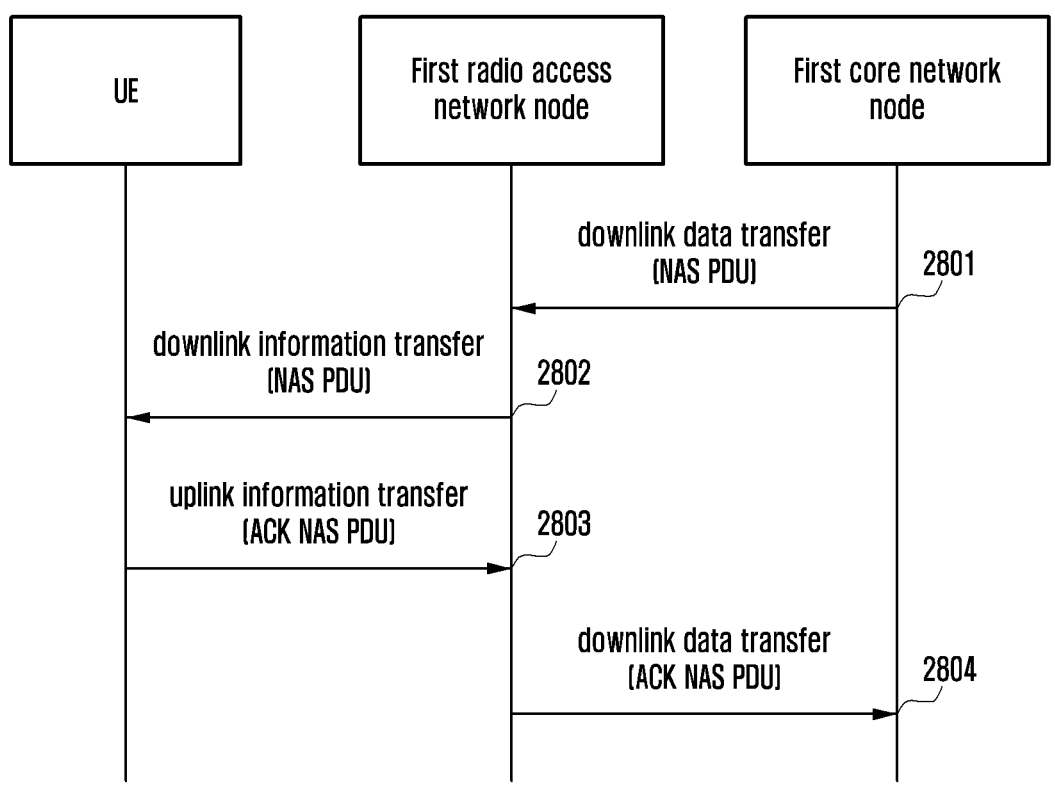
FIG. 28 is a schematic diagram illustrating a data continuity controlling method for a UE according to embodiment 6 of the present disclosure.

FIG. 28 is a schematic diagram illustrating a data transmission continuity controlling method for a user equipment according to embodiment 6 of the present disclosure. As shown in FIG. 28, the method includes procedures as follows.

At block 2801, the core network node transmits a downlink NAS transfer message to a radio access network node.

At block 2802, the radio access network node transmits a downlink information transfer message to the UE. Optionally, the message includes an index of a NAS PDU in the message.

At block 2803, the UE transmits an uplink information transfer message to the radio access network node. Optionally, the message includes data category information.

At block 2804, the core network node transmits an uplink NAS transfer message to the radio access network node. Optionally, the message includes data packet confirmation information. The data packet confirmation information is as described in block 2202, which is not repeatedly described herein. So far, the method process in the embodiment ends.

Figure 29:
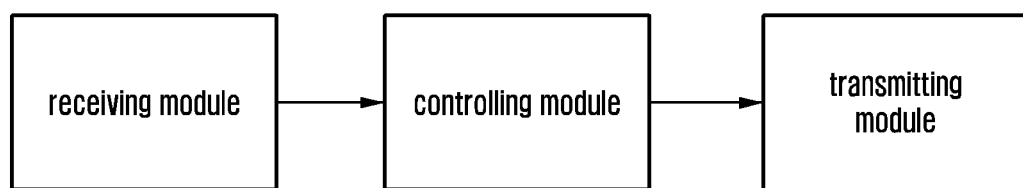
FIG. 29 is a schematic diagram illustrating a preferable structure of a network device according to the present disclosure.

FIG. 29 is a schematic diagram illustrating a preferable structure of a network device according to the present disclosure. As shown in FIG. 29, the radio access network device includes a receiving module, a transmitting module and a controlling module:

the controlling module is configured to determine whether a preset condition is satisfied; and when determining that the preset condition is satisfied, control the transmitting module to transmit data transmission information associated with the UE and/or data forwarding requirement information associated with the UE; and the transmitting module is configured to transmit the information under control of the controlling module.

Figure 30:
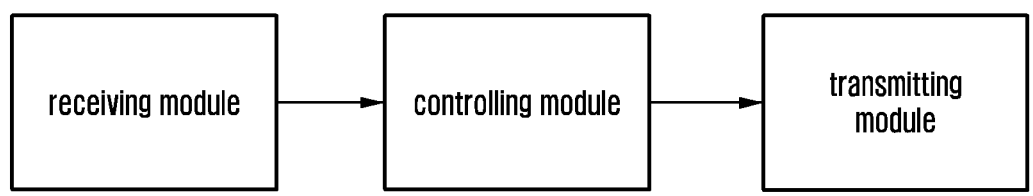
FIG. 30 is a schematic diagram illustrating a preferable structure of a network device according to the present disclosure.

FIG. 30 is a schematic diagram illustrating a preferable structure of a network device according to the present disclosure. As shown in FIG. 30, the core network device includes a receiving module, a transmitting module and a controlling module:

the receiving module is configured to receive information associated with the UE indicating data transmission from a network device, and/or receiving a data packet of the UE the controlling module is configured to control the transmitting module to perform an association operation according to the information.

Figure 31:
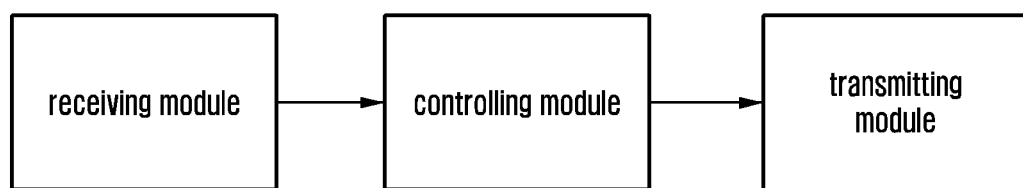
FIG. 31 is a schematic diagram illustrating a preferable structure of a network device according to the present disclosure.

FIG. 31 is a schematic diagram illustrating a preferable structure of a network device according to the present disclosure. As shown in FIG. 31, the network device includes a receiving module, a transmitting module, and a controlling module:

the controlling module is configured to determine whether a preset condition is satisfied; and when determining that the preset condition is satisfied, control the transmitting module to transmit allocated data forwarding address information; and the transmitting module is configured to transmit the information under control of the controlling module.

Figure 32:
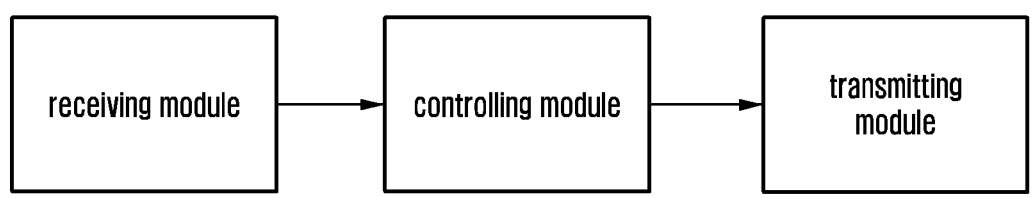
FIG. 32 is a schematic diagram illustrating a preferable structure of a user equipment according to the present disclosure.

FIG. 32 is a schematic diagram illustrating a preferable structure of a user equipment according to the present disclosure. As shown in FIG. 32, the user equipment includes a receiving module, a transmitting module and a controlling module.

The receiving module is configured to receive a data packet from a network device.

The controlling module is configured to control the transmitting module to transmit data packet confirmation information according to the received data packet.

The foregoing is only preferred examples of the present invention and is not used to limit the protection scope of the present invention. Any modification, equivalent substitution and improvement without departing from the spirit and principle of the present invention are within the protection scope of the present invention.

The invention claimed is:

1. A method performed by a radio access network (RAN) node in a wireless communication system, the method comprising:
receiving, from an access and mobility management function (AMF), a first message including first information to request to report a radio resource control (RRC) state of a user equipment (UE); and
transmitting, to the AMF, a second message including second information on the RRC state of the UE based on the first information, in case that the UE enters or leaves an inactive state.

2. The method according to claim 1, wherein the transmitting of the second message comprises transmitting, to the AMF, the second message including the second information on the RRC state of the UE based on a reporting type included in the first information, in case that the UE enters or leaves the inactive state.

3. The method according to claim 1, wherein the RRC state of the UE includes a connected state and the inactive state.

4. The method according to claim 2, further comprising receiving, from the AMF, a paging request for the UE in case that the RRC state of the UE is the inactive state.

5. A method performed by an access and mobility management function (AMF) in a wireless communication system, the method comprising:
transmitting, to a radio access network (RAN) node, a first message including first information to request to report a radio resource control (RRC) state of a user equipment (UE); and
receiving, from the RAN node, a second message including second information on the RRC state of the UE based on the first information, in case that the UE enters or leaves an inactive state.

6. The method according to claim 5, wherein the receiving of the second message comprises receiving, from the RAN node, the second message including the second information on the RRC state of the UE based on a reporting type included in the first information, in case that the UE enters or leaves the inactive state.

7. The method according to claim 5, wherein the RRC state of the UE includes a connected state and the inactive state.

8. The method according to claim 7, further comprising transmitting, to the RAN node, a paging request for the UE in case that the RRC state of the UE is the inactive state.

9. A radio access network (RAN) node, in a wireless communication system, the RAN node comprising:
a transceiver; and
a controller coupled with the transceiver and configured to:
receive, from an access and mobility management function (AMF), a first message including first information to request to report a radio resource control (RRC) state of a user equipment (UE), and
transmit, to the AMF, a second message including second information on the RRC state of the UE based on the first information, in case that the UE enters or leaves an inactive state.

10. The RAN node according to claim 9, wherein the controller is configured to transmit, to the AMF, the second message including the second information on the RRC state of the UE based on a reporting type included in the first information, in case that the UE enters or leaves the inactive state.

11. The RAN node according to claim 9, wherein the RRC state of the UE includes a connected state and the inactive state.

12. The RAN node of claim 11, wherein the controller is further configured to receive, from the AMF, a paging request for the UE in case that the RRC state of the UE is the inactive state.

13. An access and mobility management function (AMF) in a wireless communication system, the AMF comprising:
a transceiver; and
a controller coupled with the transceiver and configured to:
transmit, to a radio access network (RAN) node, a first message including first information to request to report a radio resource control (RRC) state of a user equipment (UE), and
receive, from the RAN node, a second message including second information on the RRC state of the UE based on the first information, in case that the UE enters or leaves an inactive state.

14. The AMF of claim 13, wherein the controller is configured to receive, from the RAN node, the second message including the second information on the RRC state of the UE based on a reporting type included in the first information, in case that the UE enters or leaves the inactive.

15. The AMF of claim 13,
wherein the controller is further configured to transmit to the RAN node, a paging request for the UE in case that the RRC state of the UE is the inactive state, and
wherein the RRC state of the UE includes a connected state and the inactive state.

* * * * *